United States Patent
Adler et al.

(10) Patent No.: US 9,946,702 B2
(45) Date of Patent: Apr. 17, 2018

(54) DIGITAL PROCESSING SYSTEM FOR TRANSFERRING DATA FOR REMOTE ACCESS ACROSS A MULTICOMPUTER DATA NETWORK AND METHOD THEREOF

(71) Applicant: DNA Software, Inc.

(72) Inventors: Daniel Neal Adler, San Francisco, CA (US); Bryan Marcus McCann, Stanford, CA (US)

(73) Assignee: DNA Software, Inc., San Francisco, CA (US)

( * ) Notice: Subject to any disclaimer, the term of this patent is extended or adjusted under 35 U.S.C. 154(b) by 264 days.

(21) Appl. No.: 14/941,237

(22) Filed: Nov. 13, 2015

(65) Prior Publication Data

US 2016/0142488 A1   May 19, 2016

Related U.S. Application Data

(60) Provisional application No. 62/079,963, filed on Nov. 14, 2014.

(51) Int. Cl.
*H04L 29/08* (2006.01)
*G06F 17/24* (2006.01)

(52) U.S. Cl.
CPC ................. *G06F 17/246* (2013.01)

(58) Field of Classification Search
CPC .................................................. G06F 17/246
See application file for complete search history.

(56) References Cited

U.S. PATENT DOCUMENTS

| | | | | |
|---|---|---|---|---|
| 6,671,854 | B1 * | 12/2003 | Dunsmoir | G06F 17/2247 707/999.101 |
| 2006/0046686 | A1 * | 3/2006 | Hawkins | G06F 17/3089 455/403 |
| 2011/0282941 | A1 * | 11/2011 | Chan | G06Q 10/06 709/204 |
| 2012/0005565 | A1 * | 1/2012 | Chen | G06F 17/30905 715/205 |
| 2015/0286747 | A1 * | 10/2015 | Anastasakos | G06F 17/30917 707/776 |

* cited by examiner

*Primary Examiner* — Abdullahi E Salad
(74) *Attorney, Agent, or Firm* — Travis R. Banta; TechLaw Ventures, PLLC

(57) ABSTRACT

Disclosed herein is a digital processing system for transferring data for remote access across a multicomputer data network. In one embodiment, the digital processing system is configured to receive user input, analyze the data input, assign a reference tag to the data input based on contextual information associated with the data input, and store the reference tag within a memory device that may be accessed by one or more users of the multicomputer data network.

18 Claims, 16 Drawing Sheets

| | 1 | 2 | 3 | |
|---|---|---|---|---|
| 1 | | Revenue | | ☒ |
| 2 | | Revenue | 1,000,000.00 | |

| | 1 | 2 | 3 | 4 | 5 | 6 | |
|---|---|---|---|---|---|---|---|
| 1 | | | | | | | |
| 2 | | Profit | 2009 | 2010 | 2011 | 201☒ | |
| 3 | | Profit | $100.00 | $125.00 | $156.25 | $195.31 | |

|   | 1 | 2 | 3 | 4 | 5 |
|---|---|---|---|---|---|
| 1 |   |   |   |   |   |
| 2 |   | Users | 3,000,000.00 |   |   |
| 3 |   | Monthly ARPU | $9.99 |   |   |
| 4 |   | Margin | 35.0% |   |   |
| 5 |   | Profit | =Users*MonthlyARPU*Margin |   |   |

DIGITAL PROCESSING SYSTEM FOR TRANSFERRING DATA FOR REMOTE ACCESS ACROSS A MULTICOMPUTER DATA NETWORK AND METHOD THEREOF

PRIORITY CLAIM

This application claims priority to U.S. Provisional Application No. 62/079,963, filed on Nov. 14, 2014, which is herein incorporated by reference in its entirety.

BACKGROUND

1. Technical Field

This disclosure relates generally to a digital processing system for transferring data received from a user to another location on a multicomputer data network such that other network users can remotely access the data originally received from the user. More specifically, the digital processing system disclosed herein receives data from a user and makes that data available for remote access by other users within the system. However, in order to make that data available, a method is disclosed herein for receiving the data, analyzing the data, and storing the data for access by other users.

2. Description of the Related Art

Conventional data tables use a location based identifier to differentiate each input in a table. For example, conventional data tables may be organized by rows and columns such that a reference to a particular row and a reference to a particular column identifies an input at the intersection of the particular row and the particular column. Applications have been created to allow users to create digital tables, also known as spreadsheets, which allow users to create data tables digitally. Conventional spreadsheet applications such as Microsoft® Excel®, Google Sheets™, and Zoho® Docs each allow users to create spreadsheets to perform analysis on various types of data values (e.g., numbers, text, dates, etc.). In some spreadsheet applications, a user can operate on certain data values with mathematical formulas by creating relationships between different data inputs, also known as cells, in the spreadsheet.

In one example, a spreadsheet may be identified by columns A, B, and C and rows 1, 2, and 3. The intersection of column A and row 1 is a cell referred to as A1. Other cells in the spreadsheet may be identified by the corresponding intersections of columns and rows (e.g., B1, B2, C2). A user may provide input into one of the cells. For example, the user may input the number "100" into cell A1, therefore assigning a data input to a particular location within the spreadsheet application. In cell A2, for example, a user may input a mathematical formula to perform a mathematical operation on the number in cell A1. For example, the user may input a formula "=A1+5" into cell A2, instructing the spreadsheet application that the number to be input in cell A2 equals the number contained in cell A1 plus 5. Accordingly, cell A2 would display the number "105." Further, if the input number in cell A1 was changed by a user, cell A2 would change because the mathematical formula defining the mathematical operators of cell A2 depends on the value of the number in cell A1. While this example is a simple example, skilled operators of spreadsheet applications may construct substantially more elaborate and complicated spreadsheets as needed to provide desired results.

Conventional spreadsheets have used the intersection of a row and column within the spreadsheet to identify a particular cell, regardless of the input in the actual cell. In other words, cell A1 always identifies the cell at the intersection of column A and row 1 regardless of the value data contained within cell A1. Accordingly, certain spreadsheet applications have conventionally allowed a user to access value data contained within a cell within one spreadsheet in another spreadsheet. More specifically, a user may input a file path into one cell of one spreadsheet that instructs the cell to retrieve value data contained within another cell of another spreadsheet and import that cell's value data into that one cell of that one spreadsheet. This feature is rarely used by at least some users because in order for a user to import a particular cell, the user must know exactly which cell to access. Accordingly, the user must manually navigate to the another spreadsheet and determine the location of the desired cell in that spreadsheet. Once the correct cell is identified, the user can input the file path that was just manually navigated into a particular cell and provide the cell location of the desired cell. This process is tedious and inefficient, and therefore rarely used by at least some users. Regardless, the location of the cell within the spreadsheet in terms of row and column position is still the basis for identifying the cell. Because a user must know exactly which spreadsheet contains the desirable cell value data, where the desirable cell value data is within the spreadsheet, and exactly where the spreadsheet is stored, other users, even if provided with access to the location of the stored spreadsheet, may spend a substantial amount of time locating the spreadsheet and/or the particular cell within the spreadsheet.

One solution for this problem has been to provide "named ranges" for one or more cells within a spreadsheet application. For example, a user may be allowed to give a name to a particular cell. Thus, instead of referring to cell A1, the cell may be named "MyData," for example. Thus, any other cell that uses the value data contained within cell A1 may be referenced in that other cell by the name "MyData" instead of A1. Accordingly, using the simple example above, the mathematical formula "=MyData+5" in cell A2 would still result in a value of "105" for cell A2. While this solution provides for some enhanced functionality by making somewhat complex formulas that refer to multiple cells more readable, these named ranges are commonly implemented in ways that are substantially error prone, inconvenient, and require a significant level of effort from the user to maintain consistency through a spreadsheet.

Accordingly, conventional spreadsheet applications experience several deficiencies. First, conventional spreadsheet applications require a user to manually name a particular cell or range of cells in order to reference that cell or those particular cells using the chosen name in the same spreadsheet or even in other spreadsheets. This manual naming process not only requires a substantial amount of time to implement, manual naming provides for non-standard naming conventions that are difficult for other users to even understand, much less refer to from another spreadsheet. Further, these non-standard naming conventions can cause substantial difficulty to another user attempting to decipher the meaning of particular names or terms used by a user who created the spreadsheet.

Second, because conventional spreadsheet applications rely on the row and column intersection location to identify a cell, other cells that reference particular cells within the named ranges can be inadvertently changed by moving a particular cell or named range of cells to another location. For example, if a formula in one cell references cell A1 and the formula from the simple example above (=A1+5) was moved (copied and pasted, dragged, or otherwise incorporated) into cell B2, the formula in cell B2 would be automatically updated to reference a value of B1 instead of A1 (i.e., the formula in cell B2 would become=B1+5). However, if the named range feature was used, moving the formula from A2 (in this example, =MyData+5) into B2 would provide the exact same formula in B2. In other words, both A2 and B2 would contain the formula=MyData+5. This may or may not be the desired result of the user when the formula of cell A2 was moved into cell B2, and is often not consistent with what the user would expect, based on what would have happened if the same formula moving operation was executed on a formula with a location based reference, rather than a named reference. Because this movement of value data from one cell to another by copying and pasting, dragging, or other incorporation, is a frequently used method for constructing a spreadsheet, the inconsistencies caused by moving value data in named ranges can create serious errors in the spreadsheet.

Third, conventional spreadsheet applications do not provide a user with the ability to refer or link to a particular cell or sub-range of cells within a named range. For example, if a named range includes an entire row of cells (e.g., row A) named "RowA", conventional spreadsheet applications do not allow a user to access, for example, a second entry within that named range by referencing the name RowA. A user may only access the second entry within the named range by location (e.g., A2).

Fourth, conventional spreadsheet applications only provide access to named ranges for other users when those other users have access to the underlying files that store spreadsheets where those named ranges are defined. In the event that particular spreadsheets are stored on one particular user's computer, other users may or may not have access to those spreadsheets or those named ranges. Additionally, if the user that created the spreadsheets didn't have their computer with them, they may have difficulty accessing those named ranges. Further, additional issues may be created when one user creates a formula that refers or links to a named range from a particular spreadsheet in a different file while another user updates the named range in the original spreadsheet. Because conventional spreadsheet applications fail to update named ranges that are stored in different files correctly, the imported named range may inappropriately refer to an old version of the named range without the user's knowledge.

Fifth, conventional spreadsheet applications fail to account for name collisions and other spreadsheet merging issues. For example, if two spreadsheets contain a range of cells with the same name, conventional spreadsheet applications cannot properly evaluate the formulas in the spreadsheets when the spreadsheets are combined. Since simple range names are often used in spreadsheet applications (including numerical or financial terms, such as "n," "count," or "WACC"), name collisions are a fairly frequent occurrence. Thus, when conventional spreadsheet applications encounter these name collisions, they require the users to manually rename each range, requiring a substantial amount of time from the spreadsheet user while, at the same time, potentially creating confusion concerning the meaning of the renamed ranges.

Sixth, conventional spreadsheet applications contain no indication that a named range is being used in a particular spreadsheet. If one user who did not create the spreadsheet is reviewing a spreadsheet, that user may only find out that named ranges are being used within the spreadsheet by chance, when they encounter references to those named ranges in others cells in the spreadsheet. Accordingly, in order to ensure accuracy in the results of a particular spreadsheet, a user may be required to deconstruct the spreadsheet and reconstruct the spreadsheet to ensure that each reference in each cell correctly refers to the correct cell(s). However, deconstructing and reconstructing a spreadsheet application is a tedious, inefficient, and time consuming effort.

Finally, conventional spreadsheet applications make navigating and browsing named ranges a time consuming endeavor. Accordingly, any operation to rename a named range, change the boundaries of a named range, delete or add named ranges, or other operations can present substantial difficulty to the user. Because conventional spreadsheet applications do not necessarily identify named ranges in a way that ensures the user can readily and accurately interact with a named range, a user must review each cell of a named range to determine whether or not that cell is appropriate and desired for inclusion and use in the named range.

Accordingly, it is one object of this disclosure to provide a multicomputer network system that provides a spreadsheet application that allows a user to refer to cells without reference to an intersection of a particular row and column. It is another object of this disclosure to provide a database that allows a user to access specified groups of cells across multiple spreadsheets without reference to long and arbitrary file system paths that may be difficult to read and maintain.

Another object of this disclosure is to simplify the inclusion of particular groups of cells into a spreadsheet by consistent identification and nomenclature standards across the multicomputer network system. Finally, it is another object of this disclosure to provide a multicomputer network system that performs a contextual analysis of value data within one or more cells and appropriately analyze, assign, and store a reference tag for that value data. It is a further object of this disclosure to provide a multicomputer network system that provides a spreadsheet program that allows a user to reference one or more cells within the reference tag.

SUMMARY

Disclosed herein is a digital processing system for transferring data for remote access across a multicomputer data network. The digital processing system may include a receiving module configured to receive user input representative of data input in an electronic table. The digital processing system may further include an analyzing module configured to analyze one or more instances of contextual information associated with the data input in the electronic table. The digital processing system may further include an assignment module configured to assign a reference tag to the data input in the electronic table based on the analysis of one or more instance of contextual information associated with the data input in the electronic table. Finally, the digital processing system may further include a storage module configured to store the reference tag within a memory device that provides one or more users of the multicomputer data network with access to the stored reference tag.

Further disclosed herein is a method for transferring data for remote access across a multicomputer data network. The method includes receiving, by one or more processors within a multicomputer data network, user input representative of a data input in an electronic table. The method further includes analyzing, by the one or more processors within the multicomputer data network, one or more instances of contextual information associated with the data input in the electronic table. The method further includes assigning, by the one or more processors within the multicomputer data network, a reference tag to the data input in the electronic table based on the analysis of one or more instances of contextual information associated with the data input in the electronic table. Finally, the method includes storing, by the one or more processors within the multicomputer data network, the reference tag within a memory device that provides one or more users of the multicomputer data network with access to the stored reference tag.

BRIEF DESCRIPTION OF THE DRAWINGS

The accompanying drawings illustrate various embodiments of the multicomputer network system that provides a spreadsheet application.

FIG. 13a illustrates an exemplary tagging event.

FIG. 13b illustrates a more complex exemplary tagging event.

FIG. 14 illustrates an exemplary tag reference creation event.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
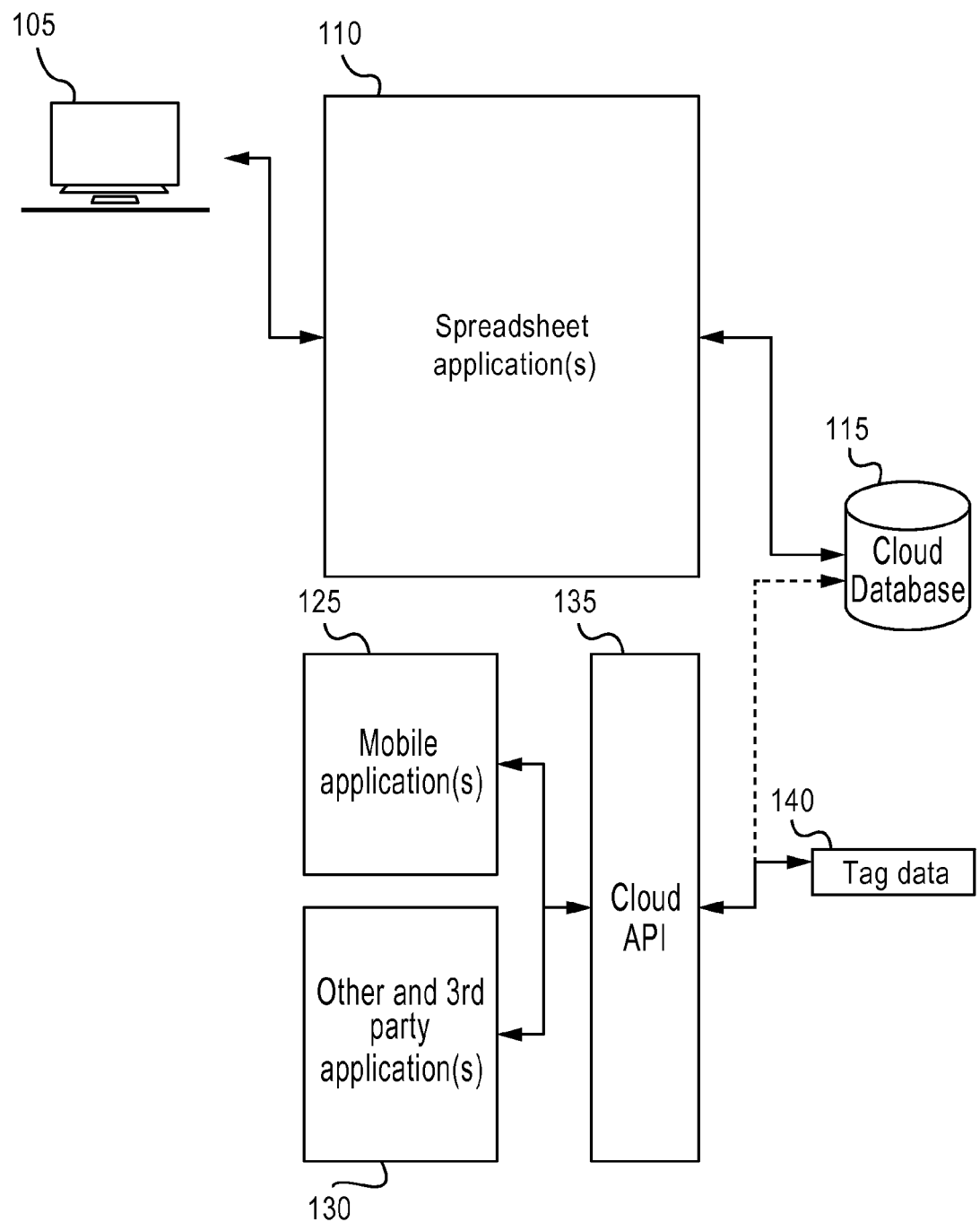
FIG. 1 illustrates an exemplary multicomputer network system that provides users with remote access to spreadsheet data.

FIG. 1 illustrates an exemplary multicomputer network system 100 that provides users with remote access to spreadsheet data. Multicomputer network system 100 implements a multi-device digital processing system including a user device 105. User device 105 may be a computing device. Examples of computing devices include desktop computers, laptop computers, tablets, game consoles, personal computers, notebook computers, and any other electrical computing device with access to processing power sufficient to interact with multicomputer network system 100. User device 105 may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within user device 105 may be used to execute the various spreadsheet applications, methods, or algorithms disclosed herein independent of other devices disclosed herein.

A user of user device 105 may use user device 105 to access a spreadsheet application 110 which may be executed on user device 105 or may be executed as a web-based application on one or more server computing devices implemented within multicomputer network system 100. Spreadsheet application 110 may provide a user with access to an electronic table configured to receive data values from a user of user device 105. The electronic table may perform mathematical calculations on the various data values received from the user of user device 105. The one or more server computing devices may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute a spreadsheet application and interface with both user device 105 and cloud database 115. The one or more server computing devices may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within one or more server computing devices may be used to execute the various methods or algorithms disclosed herein, and interface with user device 105 and cloud database 115.

In one embodiment, cloud database 115 includes one or more volatile and non-volatile memory devices, storage units, and non-transitory computer-readable storage media. Cloud database 115 maintains data related to spreadsheet application 110. Thus, a user of user device 105 may interact with spreadsheet application 110 to create a spreadsheet and store various types of data within cloud database 115 including cell values, formulas, spreadsheet formatting, user and file privacy settings, tag data, and any other data related to a spreadsheet application. "Tags," or tag data, represent cells in a spreadsheet, ranges of cells in a spreadsheet, or collections of values that are the result of some derivation of cells in a spreadsheet or existing tags, that have been given human-readable names based on a contextual analysis of the meaning of the data or assignment of a meaning by a user. Cloud database 115 may maintain a list of tags that have been created by users of multicomputer network system 100, such that every tag may be readily discoverable by any user of multicomputer network system 100. The list of tags may include a simple list, a table, a hash/lookup table, a collection of multiple tables (e.g., separate lists from across multiple files), and any other collection of organized data. The process of creating tags, performing the contextual analysis on the meaning of data, and a further explanation of the use of tags within a spreadsheet application will be described in further detail below.

In one embodiment, user device 105 may access spreadsheet application 110 via an internet connection to one or more server computing devices executing spreadsheet application 110. Any suitable internet connection may be implemented including any wired, wireless, or cellular based connections. Examples of these various internet connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between user device 105, one of more server computing devices executing spreadsheet applications 110, and cloud database 115.

Multicomputer network system 100 may further include a mobile device that may be associated with a user in order to provide the user with access to spreadsheet functionality in a mobile environment. Mobile device may be implemented by any mobile electronic device, such as a smart phone, a tablet, a personal computer, a music storage and playback device, a personal digital assistant, or any other mobile device capable of implementing a mobile application 125 or a $3^{rd}$ party application 130. Mobile application 125 may implement a spreadsheet functionality in a manner similar to that of spreadsheet application 110. Alternatively, or in addition, the mobile device may also provide access to $3^{rd}$ party application 130 which can be provided with access to the full database of traditional spreadsheet data if properly authenticated and approved. $3^{rd}$ party application 130 provides access to the traditional spreadsheet data but on a limited basis in order to ensure the confidentiality of the underlying data. Both of mobile application 125 and $3^{rd}$ party application 130 may have access to cloud API (Application Program Interface) 135 which may provide access to an authenticated user's tag data 140. In this embodiment, tag data 140 may be stored as a part of cloud database 115 except that tag data 140 is maintained to preserve user, file, and privacy data according to the user's instructions. Tag data 140 may also be stored separately to potentially limit access to non-tag data stored within cloud database 115.

The mobile device may access mobile application 125 or $3^{rd}$ party application 130 via any suitable internet wired, wireless, or cellular internet connection. Examples of these various internet connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between the mobile device and mobile application 125, and $3^{rd}$ party application 130.

Figure 2:
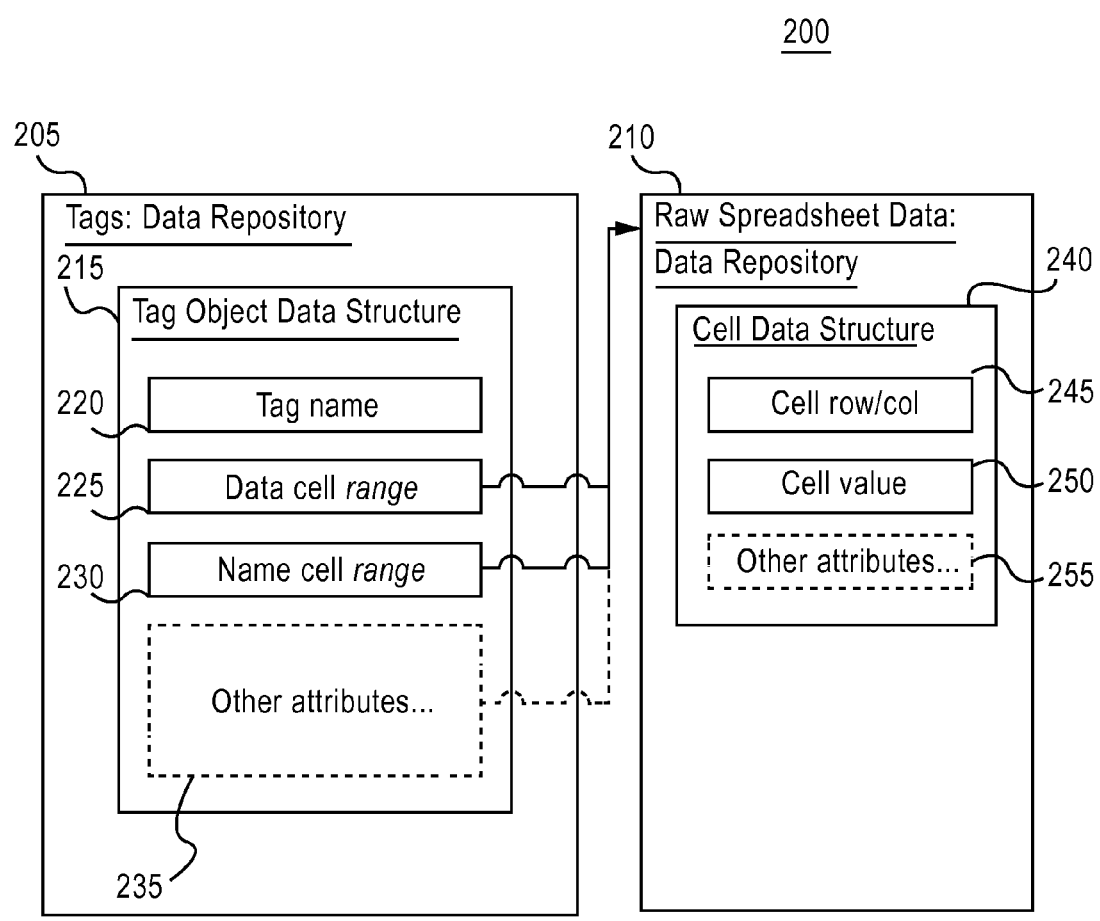
FIG. 2 illustrates an exemplary data structure for relating tag data to spreadsheet data.

FIG. 2 illustrates an exemplary data structure 200 for relating tag data in tag data repository 205 to spreadsheet data in spreadsheet data repository 210. Tag data repository 205 and spreadsheet data repository 210 may act as data stores within a non-volatile memory device, such as a non-volatile memory device implemented by cloud database 115, shown in FIG. 1. In one embodiment, the tag data repository 205 and spreadsheet data repository 210 may be implemented as tables in traditional relational databases. In another embodiment, tag data repository 205 and spreadsheet data repository 210 may be implemented as collection objects in application memory or NoSQL databases. Both of tag data repository 205 and spreadsheet data repository 210 contain partial descriptions of the structures of the individual records held in each repository. For example, tag data repository 205 maintains a tag object data structure 215. Tag object data structure 215 includes tag name 220, data cell range 225, name cell range 230 and other attributes 235. Spreadsheet data repository 210 maintains cell data structure 240. Cell data structure 240 includes cell row and column information 245, cell value information 250, and other attributes 255.

In one embodiment, tag object data structure 215 contains pointers to cells or ranges of spreadsheet cells and not the underlying values or formulas contained within the cells that are pointed to by tag object data structure 215. These pointers within tag object data structure 215 point to other information, such as the cells that are included in the tag, or the data cell range 225, the cell or cells from which the name of the tag is derived, or the name cell range 230, or other attribute data that may be meaningful to the tag. One example of other attribute data may include metadata for a particular tag value. Accordingly, the interrelation of tag data repository 205 with spreadsheet data repository 210 provides an architecture that logically applies meaningful natural-language names to underlying spreadsheet cells by using natural language tags in tag data repository 205 to point to particular cells within spreadsheet data repository 210.

Figure 3:
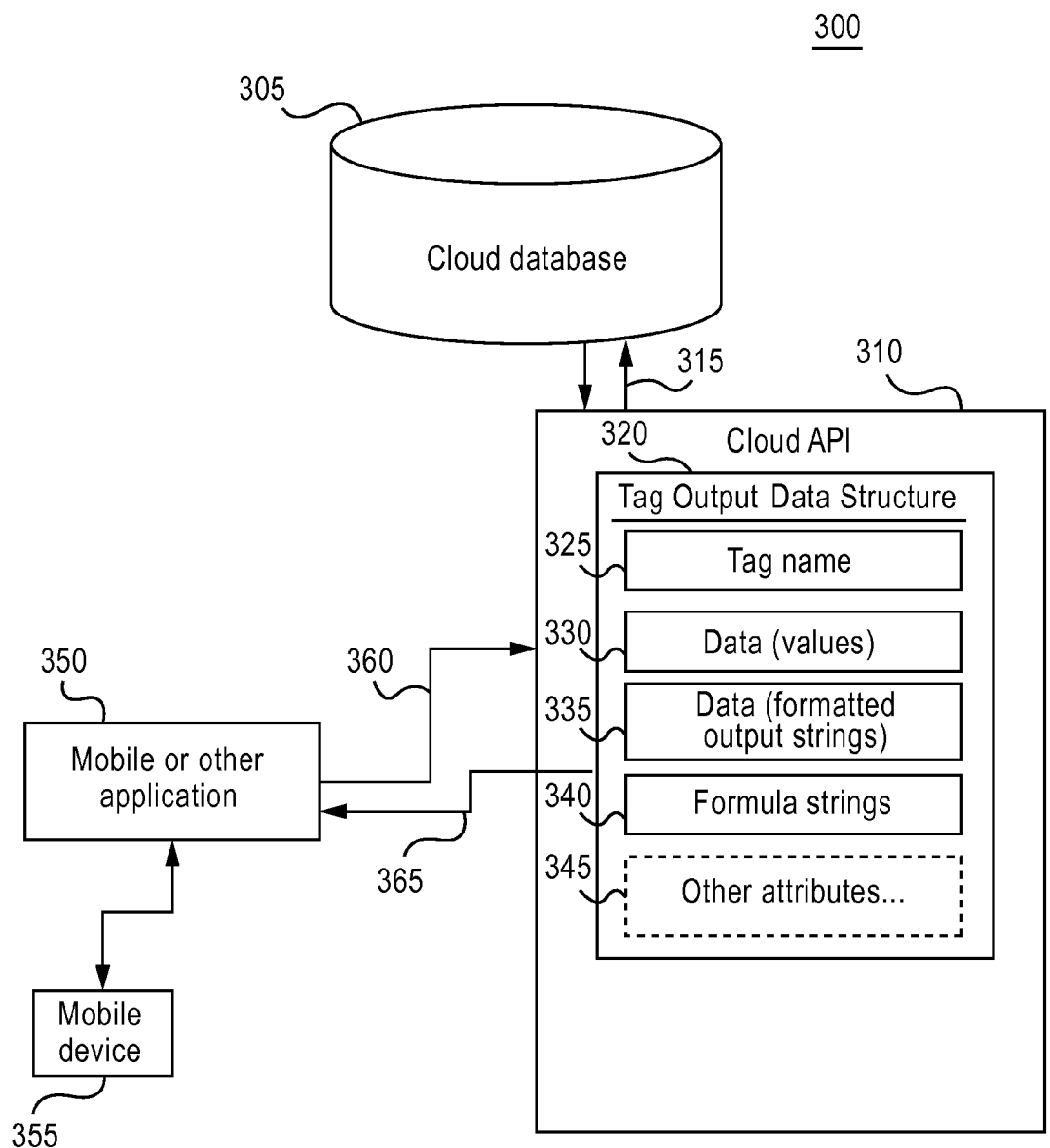
FIG. 3 illustrates an exemplary data flow for tag data between a cloud database and a mobile device.

FIG. 3 illustrates an exemplary data flow for tag data between a cloud database 305 and an end-user device, shown in FIG. 3 as mobile device 355. Cloud database 305 may be similar to cloud database 115, shown in FIG. 1 and include tag data repository 205 and spreadsheet data repository 210, shown in FIG. 2. In the embodiment of FIG. 3, a cloud API (application program interface) 310 acts as an intermediary between cloud database 305 and the end user device, shown in FIG. 3 as mobile device 355 in providing tag data to an application 350. The end user device, shown in FIG. 3 as mobile device 355, may be implemented by any electronic device, such as a smart phone, a tablet, a personal computer (laptop or desktop), a music storage and playback device, a personal digital assistant, or any other device capable of implementing a mobile or other software application 350. Application 350 may be a spreadsheet application, a mobile application, a web application, or another application as necessary to implement the data flow described herein.

Cloud API 310 includes a tag output data structure 320 which contains information such as tag name 325, data values 330, formatting data 335, formula strings 340, and other attributes 345. Accordingly, when a user of mobile device 355 transmits a request 360 to view, browse, or update tag data via application 350, cloud API 310 connects to cloud database 305 to request and receive relevant tag data via connection 315 using any of the protocols described herein. Cloud API 310 receives each requested tag's underlying spreadsheet data (values, formulas, formatting) from spreadsheet data repository 210 using the pointers contained within tag data repository 205, both shown in FIG. 2. At this point, cloud API 310 provides a response 365 to application 350 with the tag data requested at request 360. The user may then perform any spreadsheet operation, including viewing, browsing, or updating tag data by so instructing the end user device (shown in FIG. 3 as mobile device 355).

As a result, application 350 may provide traditional spreadsheet functionality while at the same time providing the user with access to both the user's created tags and values, formulas, and other information contained within a particular cell referenced by the tag. Even applications that do not implement traditional spreadsheet functionality can still provide what functionality they do offer because those applications are not required to parse and evaluate formulas and cell relationships, apply data formatting to values, and perform other tasks. This "combined" approach to provide access to spreadsheet data through tag references and conventional location based references allows a user to access and display spreadsheet information through cloud API 310 that would otherwise be unavailable to a user using some applications.

Figure 4:
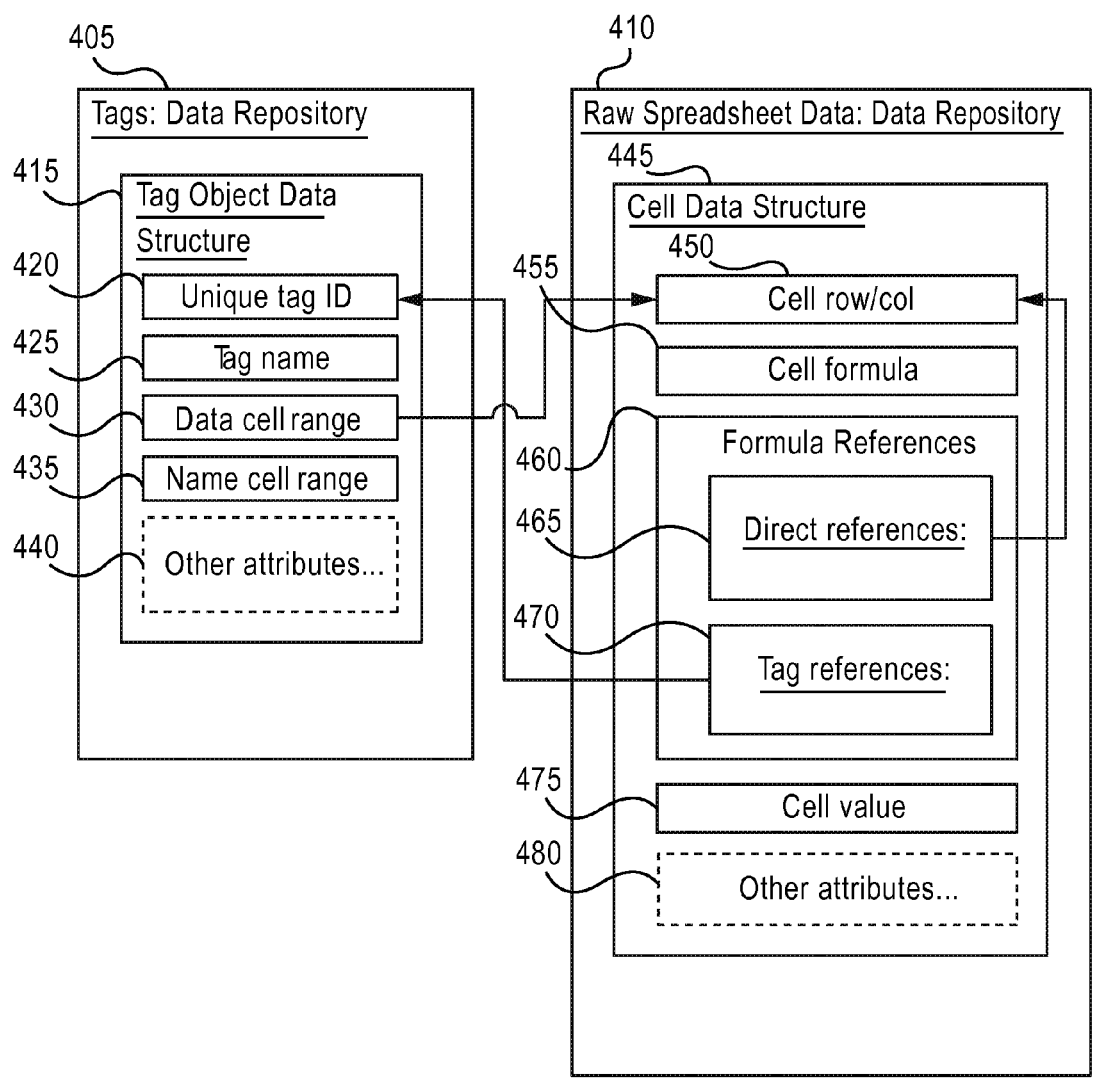
FIG. 4 illustrates an exemplary data structure for relating spreadsheet formulas that refer to tags to stored tag data.

FIG. 4 illustrates an exemplary data structure 400 for relating spreadsheet formulas that refer to tags to stored tag data. Data structure 400 includes a tag data repository 405 and a spreadsheet data repository 410. To clarify, data structure 400 illustrates a relationship between spreadsheet formulas that refer to tags and to stored tag data. For example, to define the verb "to refer" in the previous sentence, if a cell A2 has the formula=A1+5, cell A2 "references" cell A1 because the value of cell A2 is a function of the value of cell A1. Accordingly, data structure 400 provides an organization for tag data repository 405 and spreadsheet data repository 410 that allows a stored cell formula to refer to cells or to stored tags. Tag data repository 405 includes tag object data structure 415, unique tag ID 420, tag name 425, data cell range 430, name cell range 435, and other tag attributes 440. Spreadsheet data repository 410 includes cell data structure 445 which includes cell row and column information 450, cell formula information 455, formula references 460, cell values 475, and other cell attribute information 480. Formula references 460 further include direct references 460 that may include an identification of a particular file path, an identification of a particular sheet in a spreadsheet, an identification of a row and column, or other attribute information. Formula references 460 may further include tag references 470 that may include an identification of a tag, information about tag indices and arguments, or other attribute information.

While conventional applications are limited by including only direct references to a particular cell or cells in a particular file on a particular sheet on a particular column or a particular row, the inclusion of tag references 470 allows a particular cell or group of cells to be accessed and used regardless of where in memory it is stored. In order to implement tag references 470, tags are given a permanent unique identification number or code when they are created, which is stored as unique tag id 420 in tag object data structure 415. Any subsequent reference to a particular tag is recorded using the unique tag ID 420, any tag indices or arguments (which will be discussed with respect to FIG. 5, below), and any other relevant information. Accordingly, a spreadsheet application may evaluate a tag reference using an indirect multistep process. First, the reference is loaded by a processor executing a spreadsheet application (such as spreadsheet application 110, shown in FIG. 1), such as a processor contained within one or more server computing devices. Next, the tag that is pointed to by the reference is identified and loaded by, for example, a processor associated with the one or more server computing devices. At this point, the processor within one or more server computing devices calculates which cells within the tag are pointed to by the tag given the indices and arguments for the reference. Finally, the processor within one or more server computing devices loads the relevant cell values for manipulation by the user.

While this process adds some complexity to the process of evaluating a reference, a formula that is created within a spreadsheet application will be constructed in such a way as to ensure that any tags referenced by the formula are synchronized to a single value or set of values, held in the cell data structure(s) 445 pointed to by the referenced tag associated with tag object data structure 415. This consistency in tag formation allows spreadsheet application users to ensure consistent references to particular data sets across the entirety of multicomputer network system 100, shown in FIG. 1. Furthermore, a tag that is defined in one location can be accessible to any authenticated user, even on a remote computer or mobile device, allowing tag data to be transmitted across the entirety of multicomputer network system 100, shown in FIG. 1. Finally, one further advantage of the architecture of multicomputer network system 100 is that tags are not tied to an intersection of particular columns and rows to define a cell or group of cells. Tags allow users to refer to a particular cell by a name instead of by a location, making the data referenced by a tag readily portable between various spreadsheets.

Figure 5:
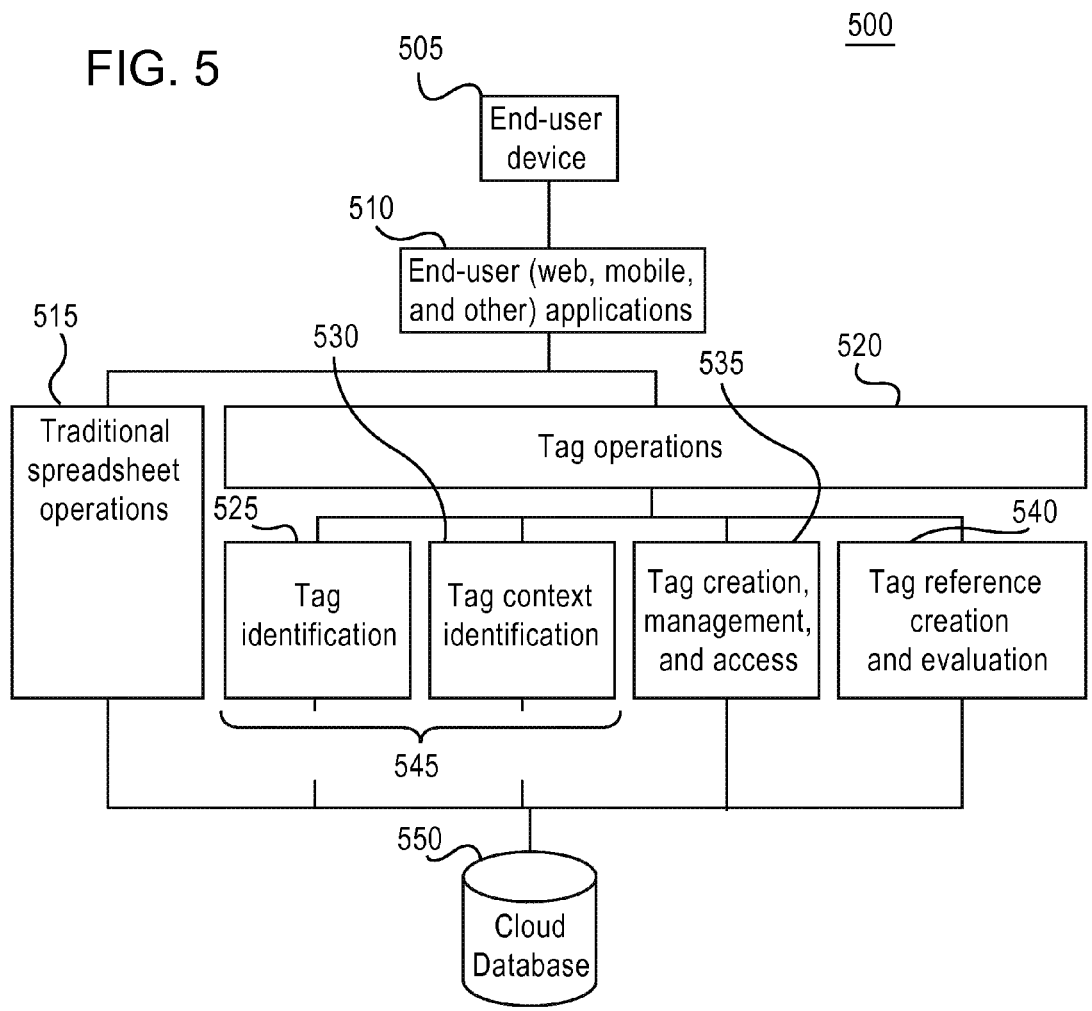
FIG. 5 illustrates an exemplary multicomputer network system that provides a spreadsheet application and tag operations which are accessed by a user via the multicomputer network system.

FIG. 5 illustrates an exemplary multicomputer network system 500 which provides an end user spreadsheet application 510 and tag operations 520 which are accessed by a user of end-user device 505 via a multicomputer network system, such as multicomputer network system 100, shown in FIG. 1. Multicomputer network system 500 provides access to end user applications 510, which in this case, includes a spreadsheet application executed by one or more processors in one or more server computing devices, such as the server computing devices described above. End user applications 510 may be a web application, a mobile application, or another application that may be used on a local, remote, or virtual machine. End user applications 510 provides for traditional spreadsheet operations 515 which may include functionality such as data entry, formula creation and analysis, data formatting tools, and the ability to analyze data that is entered and output a result. End user applications 510 may further include a number of tag operations 520 which include a tag identification operation 525; a tag context identification operation 530; a tag creation, management, and access operation 535; and a tag reference, creation, and evaluation operation 540. Each of tag operations 520 will be discussed with respect to FIG. 5 in a general overarching way. Detailed explanations of each of tag operations 520 will be provided with respect to other figures below.

Examples of tag identification operation 525 include identifying likely logical data entities and relationships between various inputs in the grid structure of a spreadsheet. Tag identification operation 525 may further include contextual information such as language, formatting, structural information, text, or value based identification for analyzing the contextual or semantic meaning for a particular cell or range of cells in a particular spreadsheet.

Examples of tag context identification operation 530 include algorithms to determine how a tag will likely fit into a broader categorical data context such as a business organization, a particular project, or other categorical data. Tag context identification operation 530 may further be used to organize tags into logical hierarchies in order to improve user access. Essentially, tag context identification operation 530 uses similar contextual information such as language information, structural information, formatting information, table creator information, storage location information, file name information, information representative of whether data within a table has a relationship to data with another table, or input value based determinations to ascertain the contextual or semantic meaning of a particular tag so that these tags can be categorized in a hierarchical way. In one simple example, end user applications 510 could identify that a range of cells in a spreadsheet program likely represent a revenue context (based on tag identification operation 525). Tag context identification operation 530 may analyze the meaning of the term revenue and insert the tag "revenue" into the user's organization's context. Thus, the "revenue" tag could identify, in natural-language terms, "Revenue for ABC Corporation's Services Division," for some theoretical user's organization ABC Corporation that has some organizational unit called Services Division. By allocating these particular tags into a specific categorical context, such as into a particular organization or particular project, tag context identification operation 530 creates a logical hierarchy of data that interrelates all of the various tags in the specific categorical context. This logical hierarchy of data that interrelates all of the various tags for a specific categorical context allows users to access and browse relevant data in a hierarchical way as opposed to just providing the users with a long alphabetical list of named ranges. The logical hierarchy of data makes browsing and accessing tags for the specific categorical context faster and more intuitive for users.

Tag identification operation 525 and tag context identification operation 530 create a "grid based natural language processing algorithm 545," also referred to as a "grid-based NLP 545." Using the foregoing techniques, end-user applications 510 use context information such as user information, language information, file information, grid information, formatting information, information about what past users have done, and other information to analyze user input and identify a semantic meaning of the input. In other words, for example, when a user inputs the term "revenue," a traditional spreadsheet application recognizes the input as text but takes no further action, only associating text for the word "revenue" with a particular cell. End user application 510, on the other hand, receives user input of the term "revenue," recognizes that the term "revenue" has a contextual meaning and attempts to determine which other cells in the spreadsheet may be related to the term "revenue" based on the location of the other cells, other language information around the cells, where the cells appear in a grid, formatting information, and other information.

Tag creation, management, and access operation 535 provides an ability for a user to manually create a new tag object or for a computer device to automatically create a new tag object within end user applications 510. Tag creation, management, and access operation 535 further provides for manual and automatic tag editing in a similar manner. Further functions of tag creation, management, and access operation 535 include allowing a user to browse created tags, search created tags, suggest new tags, share tags, or delete tags. In one embodiment, a computer device, such as those described above, executing end user applications 510 may automatically update a tag based on spreadsheet content changes as the content changes. For example and unless instructed to the contrary, if a user enters a number into a previously empty cell at the end of a tagged range (i.e., a "Revenue" tag is followed by numbers in 3 cells representing revenue for 3 consecutive years and a new number is input in the $4^{th}$ cell), tag creation, management, and access operation 535 could associate the number with the tagged range (i.e., associate the new number in the $4^{th}$ cell with the "Revenue" tag). Tag creation, management, and access operation 535 further provides features such as auto-completion of tag names when formulas are input by a user or highlighting of tags when users select tagged cells.

Tag reference creation and evaluation operation 540 creates context-aware references to tags, suggests relevant tags as the user inputs formula information, and computes the values of tag reference strings. For example, in creating a context aware reference to tags, tag reference creation and evaluation operation 540 end user applications 510 may be aware of a user clicking on a particular cell while editing a formula or the user's dragging of one or more highlighted references to tagged cells into another location. In this way, tag reference creation and evaluation operation 540 monitors references in formulas that depend on the value of another cell in a manner to ensure that the references still refer to the correct cell when edited or moved. The references that are monitored by tag reference creation and evaluation operation 540 may include tag references described with respect to tag context identification operation 530, above. However, tag reference creation and evaluation operation 540 may be used to create a correct string reference and evaluate which cells a reference actually intends to point to without using the location of the cells.

Finally, each of traditional spreadsheet operations 515; tag identification operation 525; tag context identification operation 530; tag creation, management, and access operation 535; and tag reference creation and evaluation operation 540 may send data to be stored in cloud database 550 or request and receive information stored within cloud database 550. More specifically traditional spreadsheet operations 515 and tag operations 520 may be implemented by end user applications 510 operating on computing device, including any of the computing devices disclosed herein. In one embodiment, one or more server computing devices, such as the one or more of server computing devices discussed above, may execute each of traditional spreadsheet operations 515 or tag operations 520 using a processor. In other words, each of traditional spreadsheet operations 515 or tag operations 520 may be broken down into a series of processor instructions that instruct the processor to perform the various traditional spreadsheet operations 515 or tag operations 520. Further, each of traditional spreadsheet operations 515; tag identification operation 525; tag context identification operation 530; tag creation, management, and access operation 535; and tag reference creation and evaluation operation 540 may be implemented as stand-alone modules configured to be executed by a processing device automatically or in response to a user request. For example, multicomputer network system 500 may include a receiving module configured to receive user input representative of data input in an electronic table; an analyzing module configured to analyze one or more instances of contextual information associated with the data input in the electronic table; an assignment module configured to assign a reference tag to the data input in the electronic table based on the analysis of one or more instances of contextual information associated with the data input in the electronic table; and a storage module configured to store the reference tag within a memory device that provides one or more users of the multicomputer data network with access to the stored reference tag. Each of these modules may include multiple elements and functionality for executing any of the functions, operations, algorithms, or methods disclosed herein.

Cloud database 550 may be implemented in a manner similar to cloud database 115, as shown in FIG. 1, and may act as a non-transitory computer readable storage media for receiving data, storing data, and sending stored data including data representative of, generated by, or associated with the various modules implementing traditional spreadsheet operations 515 and each of tag operations 520.

Figure 6:
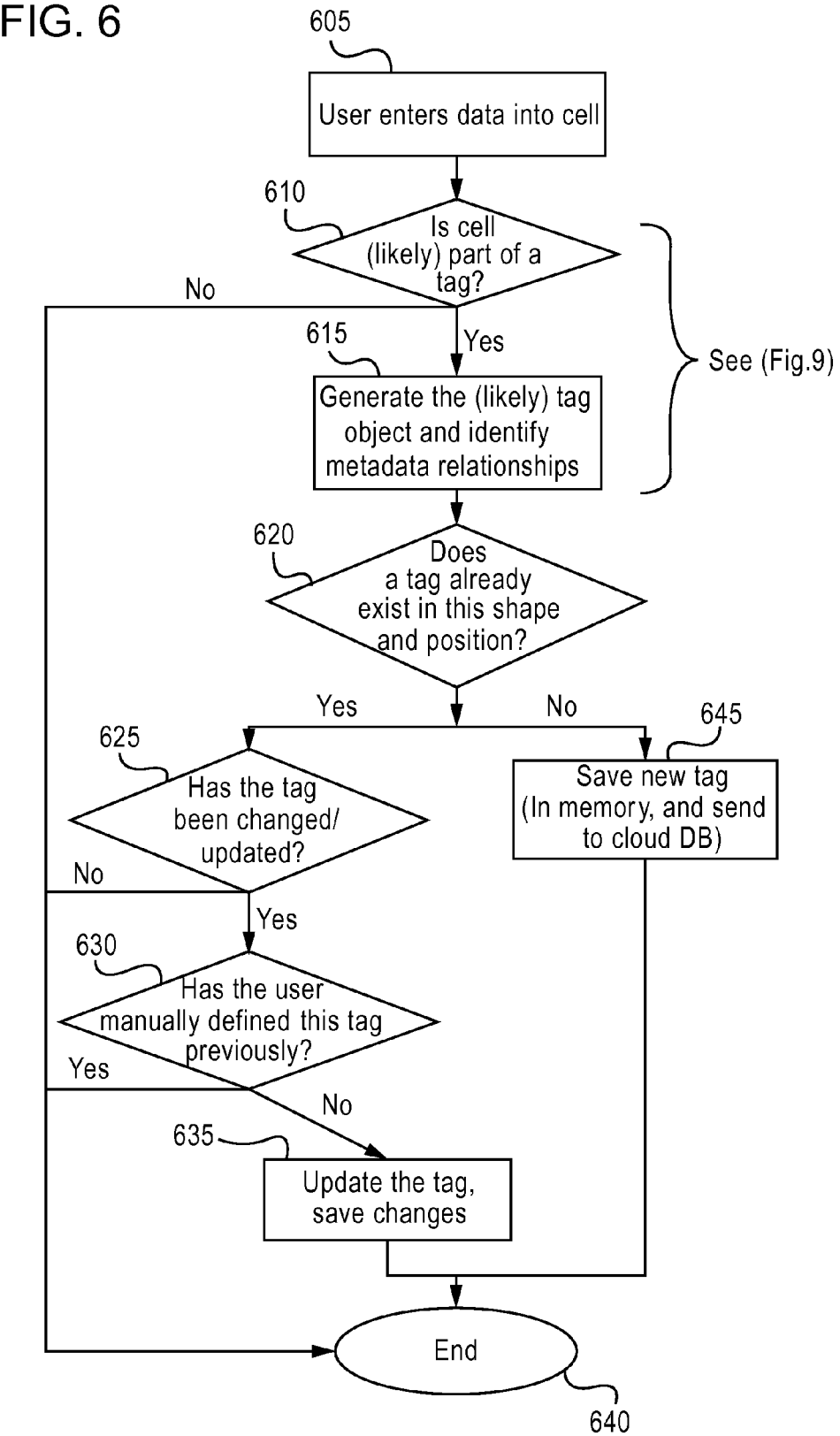
FIG. 6 illustrates a first portion of an exemplary method for tag identification and creation.

FIG. 6 illustrates a first portion of an exemplary method 600 for tag identification and creation. Method 600 begins at step 605 when a user provides input into a selected cell in a spreadsheet application, such as spreadsheet application 110 shown in FIG. 1 executing on a computing device such as a server computing device, via a user device, such as user device 105 shown in FIG. 1. User input provided into the spreadsheet application via the user device may include new data or an indication that a user wishes to edit a tag associated with the selected cell. Based on this user input, a processor within the computing device determines whether or not the selected cell is likely part of a tag at step 610. If the selected cell is likely part of a tag (610—Yes), the processor within the computing device generates a likely tag object containing or impacted by the selected cell in step 615 and identifies any metadata relationships between the tag object and other existing tags or cells. If the cell is likely not part of a tag (610—No), method 600 terminates at step 640 without storing any changes. The determination of whether or not a cell is part of a tag and the generation of likely tag object data and the identification of metadata relationships is described further with respect to FIG. 7.

Once the new tag object has been generated and metadata relationships identified in step 615, a processor executing within the computing device determines whether or not a tag already exists (i.e., if the tag is a duplicate of another existing tag). The processor executing within the computing device may determine whether or not the tag already exists by comparing the newly generated tag with known tags. Based on this comparison, the processor executing within the computing device may ascertain whether or not the user intended to create a new tag (i.e., the tag does not exist and should be created) or whether the user intended to update an existing tag (i.e., the tag does exist and the user intends to update the tag data). For example, if the processor executing within the computing device determines that a tag does not exist in a particular shape and position (620—No), the processor may store, or save, the new tag data in the computing device and may also transmit a request to store the new tag data within a cloud database, such as cloud database 115 shown in FIG. 1 or cloud database 550 shown in FIG. 5. Once the new tag data is stored, method 600 ends at step 640.

If, however, the processor executing within the computing device determines that a tag does exist in a particular shape and position (620—Yes), the processor determines whether or not the tag has been changed or updated at step 625 by determining whether or not the user input has materially changed the data referenced by a tag or other properties of the tag, including which cells are contained by the tag, the tag's name, or some other property. If the tag and the data referenced by the tag have not been changed as determined by the processor executing on the computing device at step 625, method 600 ends at step 640 without storing any changes. However, if the tag or the data referenced by the tag have been materially changed (625—Yes), the processor within the computing device determines whether or not the user has manually defined the tag at step 630. In other words, the processor within the computing device determines whether the user has previously indicated that the tag should not be automatically updated. If the user has indicated that the tag should not be automatically updated (630—Yes), method 600 ends at step 640 without storing any changes. However, if the user has not indicated that the structure of an existing tag should not be automatically updated (630—No), the existing tag is updated with the user input by the processor in the computing device at step 635. The processor in the computing device also stores, or saves, the updated tag information in memory associated with the computing device and/or transmits the updated tag information to the cloud database for storage. Once the updated tag information has been stored, method 600 ends at step 640.

Figure 7:
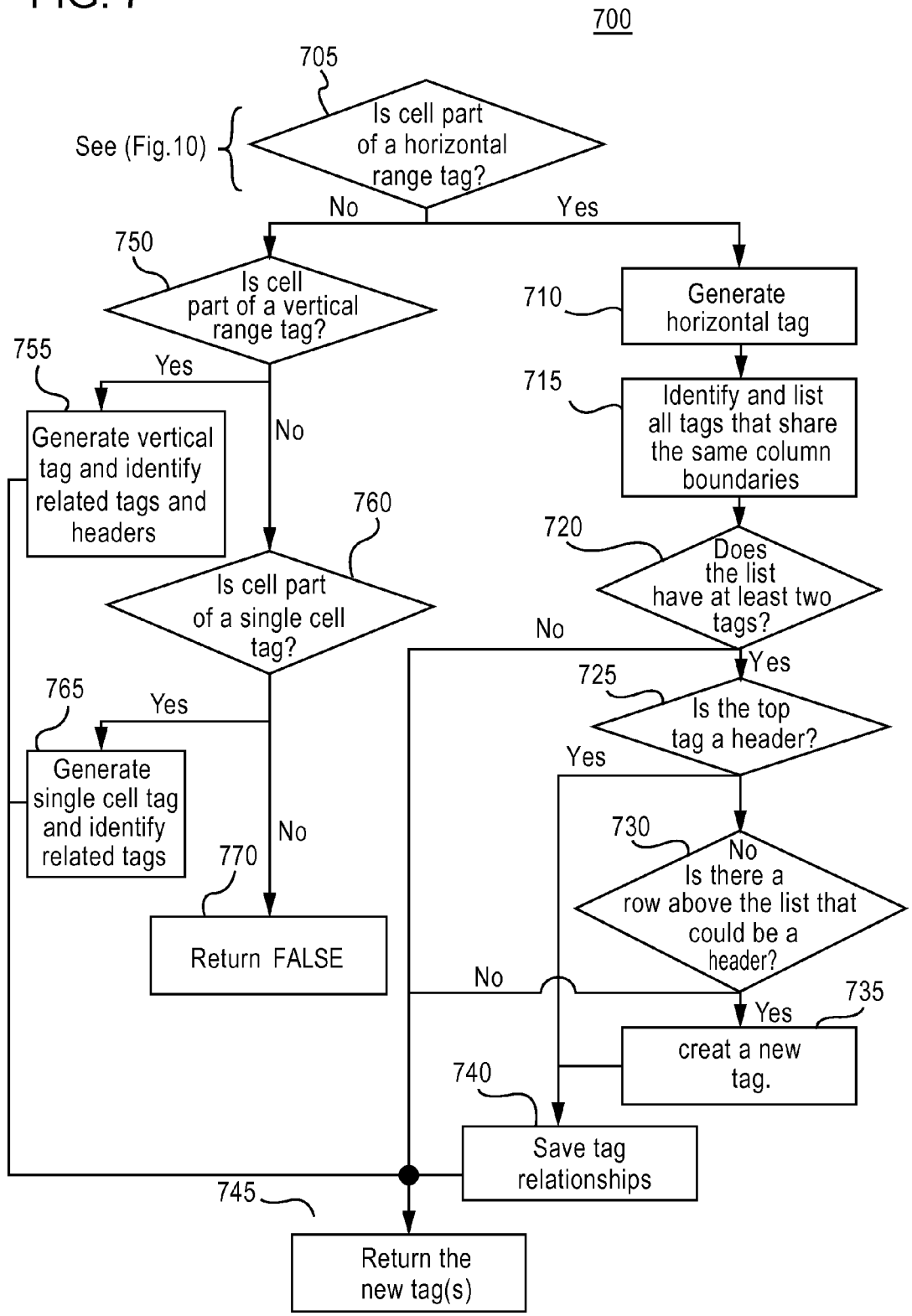
FIG. 7 illustrates a second portion of an exemplary method for tag identification and creation.

FIG. 7 illustrates a second portion of an exemplary method 700 for tag identification and creation explaining additional details of steps 610 and 615 shown in FIG. 6. Method 700 begins at step 705 in which a processor within a computing device, as defined in FIG. 6, determines whether or not a specific cell which has received new data from user input is part of a horizontal range tag. The details of horizontal, vertical, and single cell range tags will be discussed further with respect to FIG. 8. However, it is to be noted that this method 600 in FIG. 6 and method 700 may be implemented to perform checks for horizontal, vertical, and single range tags in any order. As described herein, checks for the horizontal tag are explained as beginning the series of checks at step 705. However, step 705 could also begin with vertical range tag checks or single range tag checks.

If the processor within the computing device determines that a cell is part of a horizontal range tag (705—Yes), the process of which will be discussed with respect to FIG. 8, the processor within the computing device will generate a horizontal tag at step 710 by storing basic tag data including the name of the tag, the cell range, and other information either within memory of the computing device or within the cloud database defined above with respect to FIG. 6. At step 715, the processor within the computing device identifies and lists all tags that share the same column boundaries with the newly generated horizontal tag, essentially identifying other horizontal tags that share identical left and right boundaries. At step 720, the processor within the computing device determines whether or not the list contains at least two tags. If the processor within the computing device determines that the list does not contain two tags, the new horizontal tag is returned at step 745 for further processing in step 620 of method 600, as described above. If the processor within the computing device determines that the list of tags does contain at least two tags (720—Yes), the processor within the computing device determines whether or not the top tag is a header at step 725. If the top tag in the list of tags is a header (725—Yes), the relationship between the tags is stored by the processor within the computing device within a memory device associated with the computing device and/or is transmitted to the cloud database for storage in a memory device associated with the cloud database at step 740. The header tag may be used to define the connections between various tags in the horizontal range tag and maintain data representatives of the various links between the various tags in the horizontal range tag. If the top tag is not a header (725—No), the processor within the computing device determines whether or not there is a row above the list of tags that could be a header. If there is not another row above the list that could be a header (730—No), the new horizontal tag is returned at step 745 for further processing in step 620 of method 600, as described above. If there is another row above the list that could be a header (730—Yes), a new tag is created by the processor within the computer device at step 735. The new tag is stored by the processor within the computing device within a memory device associated with the computing device and/or is transmitted to the cloud database for storage in a memory device associated with the cloud database at step 740. Additionally, the existence of a metadata relationship between the header tag and all of the tags that share column boundaries identified in step 715 is also saved at step 740. The newly created tag may be returned at step 745 for further processing in step 620 of method 600, as described above.

Figure 8:
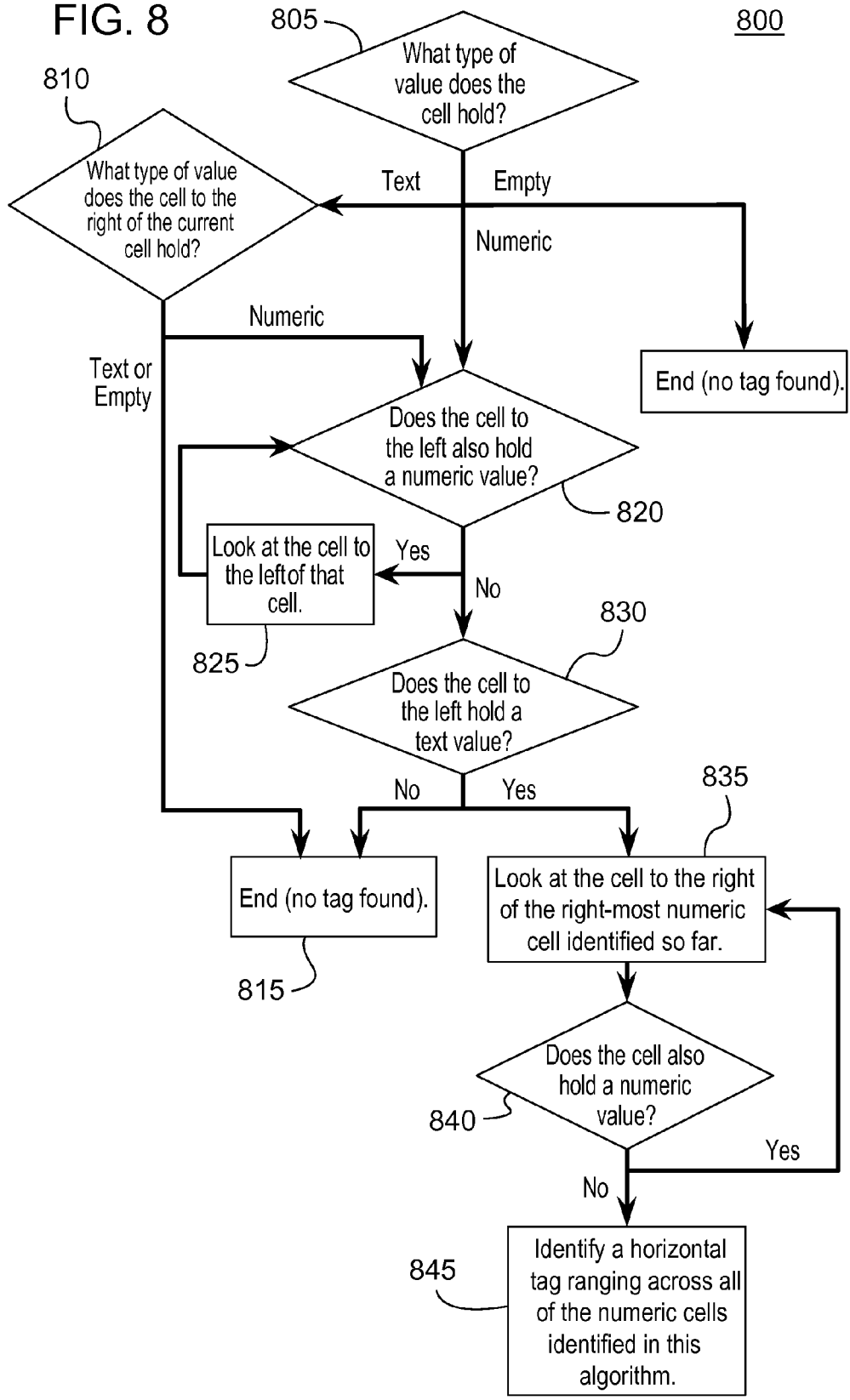
FIG. 8 illustrates a third portion of an exemplary method for tag identification and creation.

If the processor within the computing device fails to find a horizontal range tag in step 705 (705—No) based on a further detailed explanation of this process with respect to FIG. 8, the processor within the computing device determines whether or not the cell is part of a vertical range tag at step 750, which will also include further explanation with respect to FIG. 8. If the processor within in the computing device determines that the cell is part of a vertical range tag (750—Yes), the processor within the computing device generates a vertical tag and identifies the related tags and headers using a process similar to that described with respect to steps 710-745, above, at step 755. The generated vertical tags and any newly created tag may be returned for further processing at step 620 of method 600 shown in FIG. 6. If the cell is not part of a vertical range tag (750—No), the processor within the computing device determines whether or not the cell is part of a single cell tag at step 760. If the cell is part of a single cell tag (760—Yes), a single cell tag is generated by the processor within the computing device at step 765. Further, the processor within the computing device identifies all related tags, if any at step 765. Finally, if the cell is not part of a single cell tag at step 760 (760—No), a false condition is returned by the processor within the computing device at step 770, indicating that the cell is not likely part of a tag in step 610 (610—No), terminating method 600 at step 640.

It is to be noted that FIGS. 6 and 7 have been described with respect to the shape of a particular tag. Other methods may also be used to check the tag relationships besides shape and range boundaries. For example, relationships between tags and particular cells may be based on language clues, (e.g., similar words in tag names), or adaptive learning techniques for the processor in the computing device described with respect to FIGS. 6 and 7. For example, the processor may make determinations on what the tags refer to based on past experiences or user behaviors.

FIG. 8 illustrates a third portion of an exemplary method 800 for tag identification and creation explaining additional details of step 705 (and indirectly step 750) shown in FIG. 7. Method 800 is merely exemplary and only one of many algorithms that may be used to identify a type of tag. Method 800 begins at step 805 in which a processor within a computing device, as defined with respect to FIG. 6 and FIG. 7, applies a selected grid-based natural language processing ("grid-based NLP") algorithm to determine whether or not a cell is likely part of a horizontal tag, a vertical tag, or another type of tag by determining what type of value is held by a particular cell. If the particular cell is empty (805—Empty), method 800 ends and no tag is found/identified. However, if the particular cell holds text data (805—Text), method 800 proceeds to step 810 at which point the processor within the computing device determines the type of value is contained by the cell to the right of the particular cell. If the cell to the right of the particular cell contains text data or contains no data (810—Text or Empty), method 800 ends at step 815 and no tag is found/identified. If the particular cell contains numeric data at step 805 (805—Numeric) or the cell to the right of the particular cell contains numeric data (810—Numeric), the processor within the computing device determines whether or not a cell to the left of the particular cell also holds a numeric value at step 820. If, the cell to the left of the particular cell does hold a numeric value (step 820—Yes), the processor within the computing device iteratively analyzes the cell to the left at step 825 to determine whether each cell to the left also holds a numeric value 820. Steps 825 and 820 are iteratively performed until a cell to the left of the particular cell (by one or more cells) does not contain a numeric value (820—No). Once a cell is identified that does not contain a numeric value, the processor within the computing device determines whether or not the cell the identified cell contains a text value at step 830. If the identified cell does not contain a text value at step 830 (830—No), method 800 ends and no tag is found/identified.

Alternatively, if the identified cell does hold a text value at step 830 (830—Yes), the processor within the computing device analyzes one or more cells to the right of the right-most numeric cell identified up to this point of method 800 at step 835. The processor within the computing device then determines whether or not the right-most numeric cell holds a numeric value at step 840. If the right-most numeric cell holds a numeric value (840—Yes), method 800 returns to step 835 to analyze the next cell to the right of the previously right-most numeric cell. Steps 835 and 840 are iteratively performed until a right most cell is identified that does not contain a numeric value at step 840 (840—No). At this point, the processor within the computing device identifies a horizontal tag ranging across all of the numeric cells identified by method 800. It is noted that date and time values can be treated as either text or numeric values, depending on the context in which the value is found in method 800.

Tags may be identified using other techniques. For example, a contextual analysis may be performed by the processor of the computing device based on structure-based scoring, language based scoring, value based scoring, supervised or unsupervised learning algorithms, or combination algorithms. Structure-based scoring algorithms may determine a percent likelihood of a tag existing based on structural data within a spreadsheet (e.g., shape of data or way that data is laid out across a spreadsheet grid, proximity of other cells, cell/sheet formatting, and etc.). Language based scoring algorithms may determine a percent likelihood of a tag existing based on specific text entered in cells and semantic evaluation of the text (e.g., common word usage, word identification and categorization based on semantic closeness, and etc.). Value-based scoring algorithms may determine a percent likelihood of a tag existing based on the value of a particular cell (e.g., whether or not the value within the cell is within a range of expected values, and etc.). Supervised or unsupervised learning algorithms may determine a percent likelihood of tag membership based on similarities of the current structural and language context to those in which previous users have created tags and/or corrected the original tagging algorithm. Finally, combination algorithms may determine a percent likelihood of tag membership based on some combination of a structure-based scoring algorithm, a language-based scoring algorithm, a value-based scoring algorithm, and a supervised or unsupervised learning algorithm.

Figure 9:
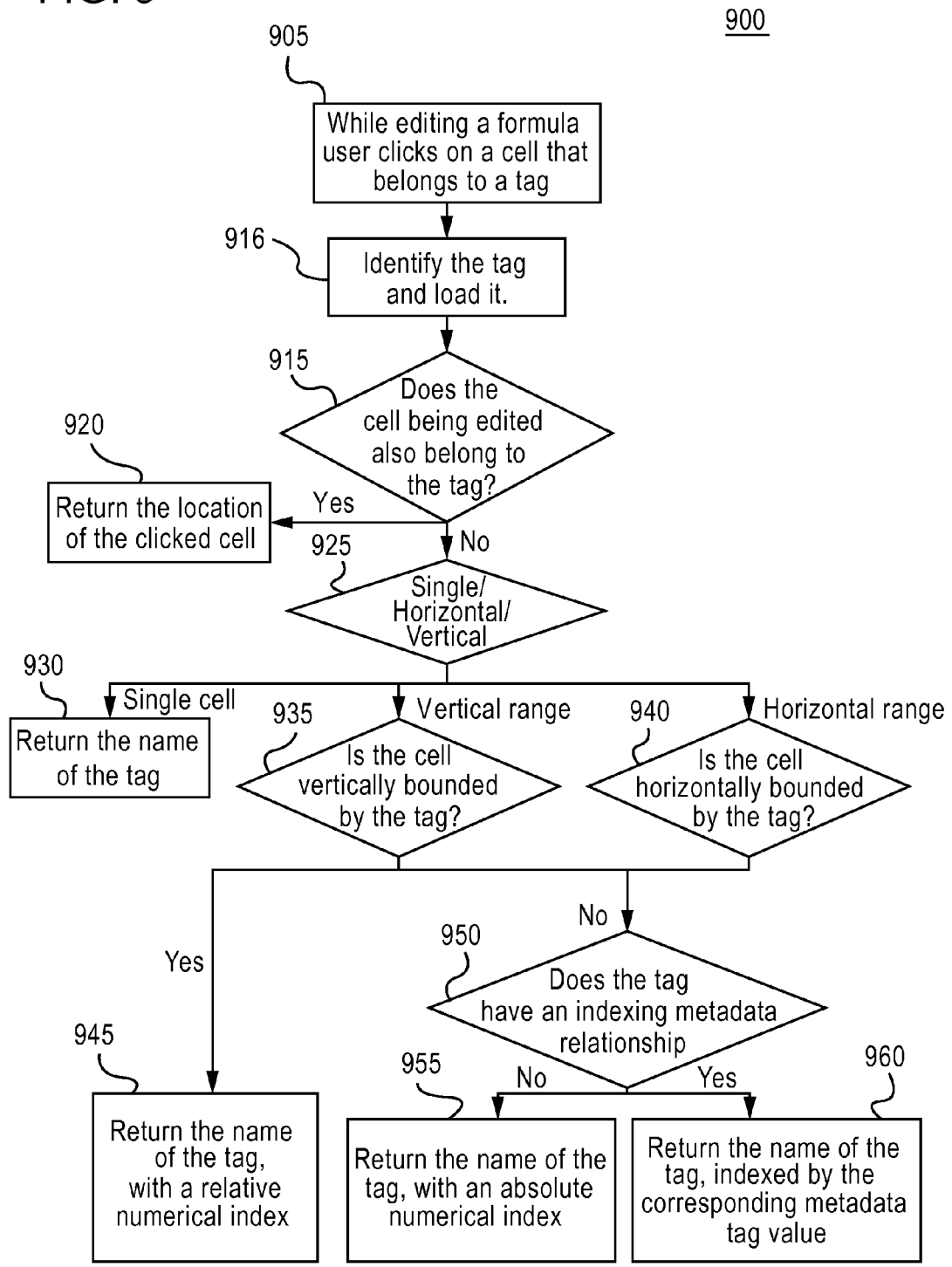
FIG. 9 illustrates an exemplary method for tag reference creation.

FIG. 9 illustrates an exemplary method 900 for creating a reference to a tag in a formula. Method 900 begins at step 905 when a user, interacting with a user device, such as user device 105 shown and discussed in connection with FIG. 1, while editing a formula in a cell in a spreadsheet application (the "edited cell"), such as spreadsheet application 110 operating on a server computing device, discussed in connection with FIG. 1, selects another cell or group of cells that the user intends to refer to in the formula, if that clicked cell or group of cells is part of a tag. In response to the selection of the cell or group of cells that belongs to a tag (by for example a mouse click or by navigating to the desired cell or group of cells using a keyboard's arrow keys) that the user wishes to refer to (the "clicked cell"), a processor within server computing device identifies the tag that the clicked cell belongs to (the "clicked tag") and loads it at step 910 from either a memory device associated with the server computing device or a cloud database such as cloud database 115 shown and discussed above in connection with FIG. 1. At step 915, the processor within the server computing device determines whether or not the edited cell (which contains the formula being edited) also belongs to the clicked tag. If the edited cell does belong to the clicked tag (915—Yes), the processor within the server computing device returns the location of the clicked cell at step 920. At step 920, the processor within the server has essentially determined that the reference to be created in the formula in the edited cell should be a location-based reference (such as 3_3), rather than a tag reference, because the clicked tag encompasses the edited cell, and a cell within a tag referencing that same tag (a "self reference") could result in unexpected calculation behavior and, potentially, depending on what formulas are used in the spreadsheet, could result in an infinite or circular calculation loop, and method 900 ends.

If the edited cell does not belong to the clicked tag (915—No), the processor within the server computing device determines a shape for the clicked tag (i.e., whether it is a single cell, horizontal, or vertical) at step 925. Such a determination may be made by a processor performing any algorithm or method described herein that determines the shape of a tag. If the processor within the server computing device determines that the clicked tag has the shape of a single cell (925—Single Cell), the processor returns the name of the clicked tag or an unindexed reference to the clicked tag at step 930, so that the edited cell's formula can include a reference to the clicked tag using its name. Once the name of the clicked tag is returned at step 930, method 900 ends.

If the shape of the clicked tag is determined to be vertical in step 925 (925—Vertical range), the processor within the server computing device determines whether or not the edited cell is vertically bounded by the clicked tag at step 935. In other words, the processor within the server computing device determines whether or not the edited cell is positioned in a row between the top and bottom rows of the clicked tag, inclusive. Similarly, if the shape of the clicked tag is determined to be horizontal in step 925 (925—Horizontal range), the processor within the server computing device determines whether or not the edited cell is horizontally bounded by the clicked tag at step 940. In other words, the processor within the server computing device determines whether or not the edited cell is positioned between the left-most and right-most columns of the clicked tag, inclusive.

If the edited cell is either vertically bounded by the clicked tag (935—yes) or the cell is horizontally bounded by the clicked tag (940—yes), the processor within the server computing device returns the name of the vertical or horizontal clicked tag with a relative numerical index at step 945. A relative numerical index identifies the location of a specific clicked cell within a tag relative to the cell being edited (that is, the cell that contains the formula that contains the reference to the clicked cell), and is used in favor of an absolute numerical index (described below) when the cell being edited is horizontally or vertically bounded by the vertical or horizontal tag, respectively. Thus, for example, if a tag includes a particular cell that is clicked while the user is editing another cell that is bounded by the tag, the location of the clicked cell may be identified using the tag's name and by a relative numerical index, instead of by an absolute location. In other words, if a horizontal tag is named "Revenue," for example, a cell that is located one column to the left of the cell being edited may be referred to as "Revenue(-1)" instead of being referred to as an intersection of a column and a row (e.g. location 3_3) or being referred to using the tag name and an absolute numerical index (described below). If the tag contains only a single cell, that cell can be referred to with just the name of the tag, as no index (either relative or absolute) is necessary to differentiate between multiple cells included in the tag.

If the edited cell is not either vertically bounded by the clicked tag (935—No) or horizontally bounded by the clicked tag (940—No), the processor within the server computing device determines whether or not the clicked tag has an indexing metadata relationship to another tag (the "metadata tag" or "header tag") at step 950. If the vertical or horizontal clicked tag does not have an indexing metadata relationship (950—No), at step 955, the processor within the server computing device returns the name of the clicked tag with an absolute numerical index. In other words, if a horizontal tag is named "Revenue," each cell within the tag may be referenced by absolute position, or index, of the cell relative to the tag (e.g., "Revenue(0), Revenue(1), Revenue (2), etc.). This ability to reference individual cells within a named range is not available in conventional spreadsheet applications that rely on conventional location based identification for particular cells or named ranges. Spreadsheet application 110, for example, provides a novel solution to this problem by providing for a numerical index relative to a tag, thereby removing the need to identify a cell by location while introducing the ability to reference an individual cell within a tag.

If the clicked cell does contain an indexing metadata relationship at step 950 (950—Yes), the processor within the server computing device returns the name of the clicked tag indexed by a corresponding metadata tag value. In other words, tags may also be indexed by the values in another tag—the header tag—that may describe a particular clicked cell within the clicked tag. For example, a horizontal clicked tag named Revenue may have a header tag in the row above it which contains references to dates or time periods, such as "Quarter 1, 2014," or "2015," or "January," etc. If a metadata indexing relationship exists, the cells within the Revenue tag, or a specific clicked cell, may be identified in a novel way in semantic human-language terms as, for example "=Revenue('Quarter 1, 2014')" or "=Revenue ('2015') or "=Revenue('January')." Thus, references to a single cell or group of cells within a tag may be defined or impacted by other tags, formulas, and cells across a spreadsheet application, such as spreadsheet application 110. Further, each tag may be remotely accessible to any authenticated user connected to a multicomputer network, such as multicomputer network system 100 as shown in FIG. 1.

In each of the instances above in which a tag reference is created using an index (whether relative, absolute, or using a header tag) to refer to a subset of that tag in steps 945, 955, and 960, that step can also return a pair of indices that indicate a range of cells within the tag, rather than just a single cell. For example, a range of relative indices could allow the user to refer to multiple cells in a tag named Revenue that cover a range of relative locations, such as all of the cells between the column to the left of the edited cell and the column two to the right of the edited cell, or "=Revenue(−1:2)." Similarly, a range of absolute indices could cover the first and second cells in the Revenue tag, or "=Revenue(0:1)." Finally, a range of metadata indices could cover the cells between two time periods that are entered in a header tag above the clicked tag, such as "=Revenue ('January':'March')." Once, the name of the tag and the corresponding indexing information is returned by the processor of the server computing device in steps 945, 955, and 960, method 900 ends.

Figure 10:
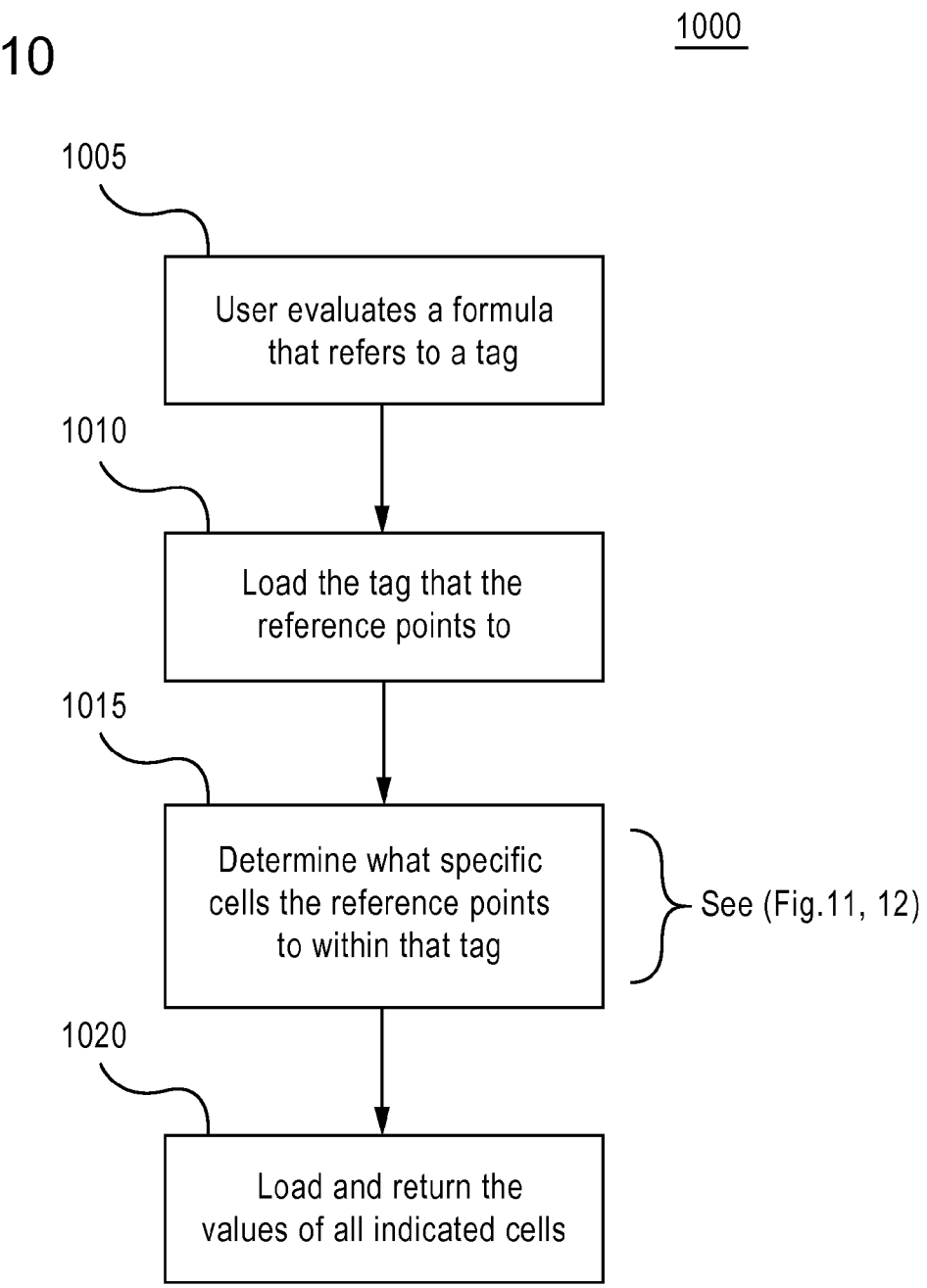
FIG. 10 illustrates a first portion of an exemplary method for tag reference evaluation.

FIG. 10 illustrates a first portion of an exemplary method 1000 for tag reference evaluation. Method 1000 explains a process for evaluating textual tag references for a spreadsheet application, such as spreadsheet application 110 shown in FIG. 1, operating on a server computing device, such as a server computing device discussed above, in a multicomputer network, such as multicomputer network system 100, shown in FIG. 1. A user of a user device, such as user device 105 shown in FIG. 1, may choose to evaluate a particular cell in a spreadsheet application by providing user input. For example, the user may position a cursor in a particular cell of a spreadsheet produced by the spreadsheet application and press an "enter" key on a keyboard provided by the user device. Such user input instructs a processor within the server computing device to evaluate a formula that is contained in a cell being evaluated (the "evaluated cell") that refers to a tag (the "referenced tag") at step 1005. In response to the user input, the processor within the server computing device may request the tag data referenced in the formula from a cloud database, such as cloud database 115 shown in FIG. 1. The processor may load the tag that is referenced, or pointed to, by the formula into the spreadsheet application in step 1010. At step 1015, the processor within the server computing device may determine what specific cells in a spreadsheet are pointed to by the loaded referenced tag, and which of those cells the specific tag reference in the formula refers to. The details of step 1015 will be further explained with respect to FIG. 11 and FIG. 12. For purposes of discussion here, it is assumed that the processor within the server computing device is able to determine which cells are referenced by a tag. At step 1020, the processor within the server computing device may determine the values of all cells indicated as being pointed to by the tag reference, return the values of all cells indicated as being pointed to by the tag reference, and returning the value of all cells indicated as being pointed to by the tag reference to be used by the method or algorithm that evaluates the evaluated cell's complete formula. In this way, a user of a spreadsheet application is able to instruct a processor that executes the spreadsheet application to evaluate a mathematical formula that includes references to tags.

Figure 11:
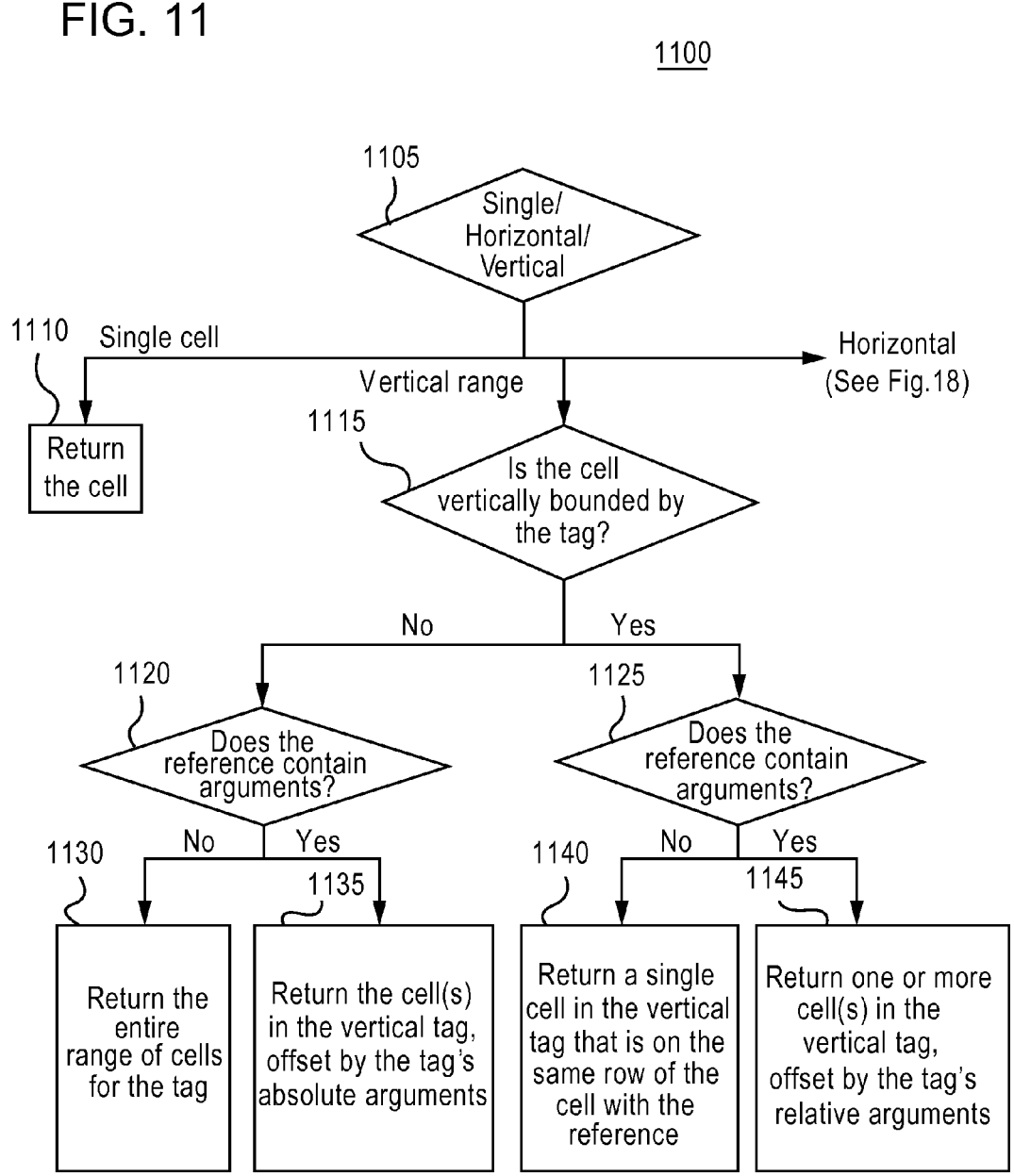
FIG. 11 illustrates a second portion of an exemplary method for tag reference evaluation.

FIG. 11 illustrates a second portion of an exemplary method 1100 for tag reference evaluation. Method 1100 explains step 1015 shown in FIG. 10 in additional detail using the same devices, storages, and multicomputer configuration discussed above with respect to FIG. 10. Method 1100 begins by a processor within a server computing device determining which specific cells are referenced by a tag at step 1105 when the processor within the server computing device determines the shape of the referenced tag (e.g., whether the tag is a single cell, horizontal, or vertical). Method 1100 explains the process for determining which specific cells are referenced by a single cell tag or a vertical range tag. If the reference refers to a single cell tag (1105—Single cell), the processor within the server computing device returns the location of the cell at step 1110. Once the location of the cell at step 1110 is returned by the processor within the server computing device, method 1000 may continue at step 1020.

If, however, the reference refers to a vertical range tag (1105—Vertical range), the processor within the server computing device determines whether or not the evaluated cell is vertically bounded by the referenced tag at step 1115. In other words, the processor within the server computing device determines whether or not the evaluated cell (that is, the cell containing the formula being evaluated in step 1005) is contained within a particular row and is positioned between the top and bottom rows of the referenced tag. If the evaluated cell is not vertically bounded by the referenced tag (1115—No), the processor within the server computing device determines whether or not the reference contains arguments, or indices, for the tagged cells at step 1120. If the processor within the server computing device determines that the reference does not contain arguments or indices (1120—No), the processor returns the entire range of cells for the referenced tag at step 1130. Once the entire range of cells for the tag is returned by the processor within the server computing device, method 1000 may continue at step 1020.

If the evaluated cell is vertically bounded by the referenced tag (1115—Yes), the processor within the server computing device determines that the reference does contain arguments or indices (1120—Yes), the processor returns the one or more cells in the vertical tag offset by the tag's absolute arguments at step 1135. In one embodiment, these absolute arguments could be metadata based, as described above, or may be numerical arguments or indices, as also described above. Once the one or more cells in the vertical tag offset by the tag's absolute arguments is returned by the processor within the server computing device, method 1000 may continue at step 1020.

If the evaluated cell is vertically bounded by the referenced tag (1115—Yes), the processor within the server computing device determines whether or not the reference contains arguments, or indices, for the tagged cells at step 1125. If the processor within the server computing device determines that the reference does not contain arguments or indices (1125—No), the processor returns the single cell in the vertical referenced tag that is on the same row as the evaluated cell at step 1140. Finally, if the processor within the server computing device determines that the reference does contain arguments or indices (1125—Yes), the processor returns one or more cells in the vertical referenced tag in step 1145 which are offset by the tag's relative arguments, as described above.

Figure 12:
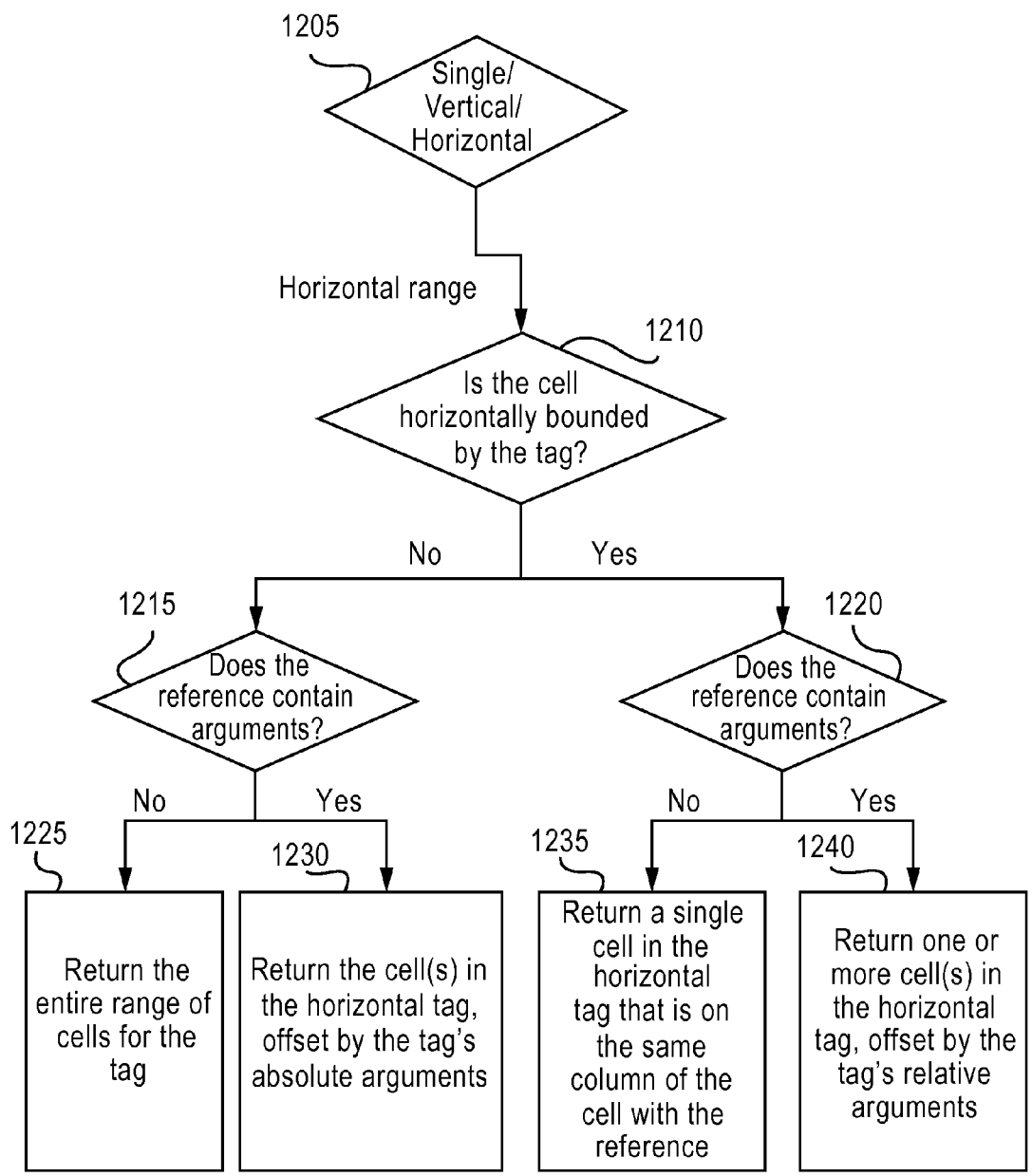
FIG. 12 illustrates a third portion of an exemplary method for tag reference evaluation.

FIG. 12 illustrates a third portion of an exemplary method 1200 for tag reference evaluation. Method 1200, in combination with method 1100 shown in FIG. 11, explains step 1015 shown in FIG. 10 in additional detail using the same devices, storages, and multicomputer configuration discussed above with respect to FIG. 10. Method 1200 begins by a processor within a server computing device determining which specific cells are referenced by a tag at step 1205 when the processor within the server computing device determines the shape of the tag (e.g., whether the tag is a single cell, horizontal, or vertical). Method 1200 explains the process for determining which specific cells are referenced by a horizontal cell tag. If the reference refers to a horizontal tag (1205—Horizontal range), the processor within the server computing device determines whether or not the evaluated cell is horizontally bounded by the referenced tag at step 1210. In other words, the processor within the server computing device determines whether or not the evaluated cell is contained within a particular column and is positioned between the left-most and right-most columns of the referenced tag. If the evaluated cell is not horizontally bounded by the referenced tag (1210—No), the processor within the server computing device determines whether or not the reference contains arguments, or indices, for the tagged cells at step 1215. If the processor within the server computing device that the reference does not contain arguments or indices (1215—No), the processor returns the entire range of cells for the referenced tag at step 1225. Once the entire range of cells for the tag is returned by the processor within the server computing device, method 1000 may continue at step 1020.

If the server computing device determines that the reference does contain arguments or indices (1215—Yes), the processor returns one or more cells in the horizontal referenced tag offset by the tag's absolute arguments at step 1230. In one embodiment, these absolute arguments could be metadata based, as described above, or may be numerical arguments or indices, as also described above. Once the one or more cells in the horizontal tag offset by the tag's absolute arguments is returned by the processor within the server computing device, method 1000 may continue at step 1020.

If the evaluated cell is horizontally bounded by the referenced tag (1210—Yes), the processor within the server computing device determines whether or not the reference contains arguments, or indices, for the tagged cells at step 1220. If the processor within the server computing device determines that the reference does not contain arguments or indices (1220—No), the processor returns the single cell in the horizontal tag that is on the same column as the evaluated cell at step 1235. Finally, if the processor within the server computing device determines that the reference does not contain arguments or indices (1220—Yes), the processor returns one or more cells in the horizontal tag in step 1240 which are offset by the tag's relative arguments, as described above.

FIG. 13*a* illustrates an exemplary tagging event 1300*a*. In this exemplary embodiment, a spreadsheet 1305*a* may be provided by a spreadsheet application such as spreadsheet application 110 shown in FIG. 1, operating on a server computing device, such as a server computing device discussed above, in a multicomputer network, such as multicomputer network system 100, shown in FIG. 1. The user may interact with the spreadsheet application via a user device connected to the server computing device executing the spreadsheet application, such as user device 105 shown in FIG. 1. As shown in FIG. 13*a*, a user has entered data into cell 1325*a* and cell 1330*a*. The data in cell 1325*a* is textual data 1310*a* ("Revenue") while the data in cell 1330*a* is numerical data 1315*a* (1,000,000.00). Once the user entered data into cell 1325*a* and cell 1330*a* a processor within a server computing device executed a tagging algorithm disclosed with respect to FIGS. 5-12, to automatically identify that a relationship existed between textual data 1310*a* and numerical data 1315*a*. The processor further determines, by executing the tagging algorithms disclosed herein, that the cell 1325*a*, which is to the left of cell 1330*a*, likely provided a name for the data in cell 1330*a*. As a result, the processor tagged the numerical data 1315*a* with the name given by the textual data 1310. The processor further instructed the spreadsheet application to highlight the new tag 1320*a* by thickening the border around cells 1325*a* and 1330*a*, and displaying the name of the new tag 1320*a* "Revenue" in the a user interface device (a visual display) associated with the user device. While highlighting may or may not be implemented, the processor within the server computing device may provide a visual cue to show that a one or more cells have been tagged, as shown in FIG. 13*a*.

FIG. 13*b* illustrates a more complex exemplary tagging event 1300*b*. In this exemplary embodiment, a spreadsheet 1305*b* may be provided by a spreadsheet application such as spreadsheet application 110 shown in FIG. 1, operating on a server computing device, such as a server computing device discussed above, in a multicomputer network, such as multicomputer network system 100, shown in FIG. 1. The user may interact with the spreadsheet application via a user device connected to the server computing device executing the spreadsheet application, such as user device 105 shown in FIG. 1. As shown in FIG. 13*b*, a processor within a server computing device executing a tagging algorithm has tagged multiple cells in a row identified between cells 1315*b* and 1330*b* as profit with the tag "Profit" 1320*b* based on the textual data 1310*b* (the word profit) being input by a user. Tag 1320*b* and cells 1315*b* through 1330*b* may be displayed with a heavy or thickened border to provide a visual cue to the user to show that a one or more cells have been tagged, as shown in FIG. 13*b*

FIG. 14 illustrates an exemplary tag reference creation event 1400. In this exemplary embodiment, a spreadsheet 1405 may be provided by a spreadsheet application such as spreadsheet application 110 shown in FIG. 1, operating on a server computing device, such as a server computing device discussed above, in a multicomputer network, such as multicomputer network system 100, shown in FIG. 1. The user may interact with the spreadsheet application via a user device connected to the server computing device executing the spreadsheet application, such as user device 105 shown in FIG. 1. Spreadsheet 1405 provides a model for estimating a business' profits. As spreadsheet 1405 is constructed, the processor within the server computing device has created several tags 1415—"users" identifying the number of a business' customers, "monthly ARPU" identifying the monthly average revenue per user for the business, "margin" identifying the profit margin percent for the business, and "profit" identifying the total profit for the business. Further, numerical data values 1410 are provided that are described by each of the several tags 1415. When the user creates a formula 1420 that refers to these cells, the processor within the server computing device automatically replaces any location based references to the cells with the relevant tag names. Thus, instead of formula 1420 appearing as a string of grid locations multiplied by each other, formula 1420 provides a human-readable semantically meaningful formula, namely "=Users*Monthly ARPU*Margin. In other words, the tag profit refers to a numerical value of a formula calculated by multiplying the value for users, the value for monthly ARPU, and the value for the margin.

Other embodiments are possible. For example, the processor within the server computing device may recognize certain tags and may automatically provide known mathematical formulas for calculating other information. For example, if the a tag is created for "revenue" and for "profit," the processor within the server computing device may recognize that a profit margin may be calculated by dividing the profit by the revenue and automatically provide the formula for the user. In other words, the processor within the server computing device may recognize a context of the textual or numerical data and provide suggestions, formulas, or other information accordingly.

Figure 15:
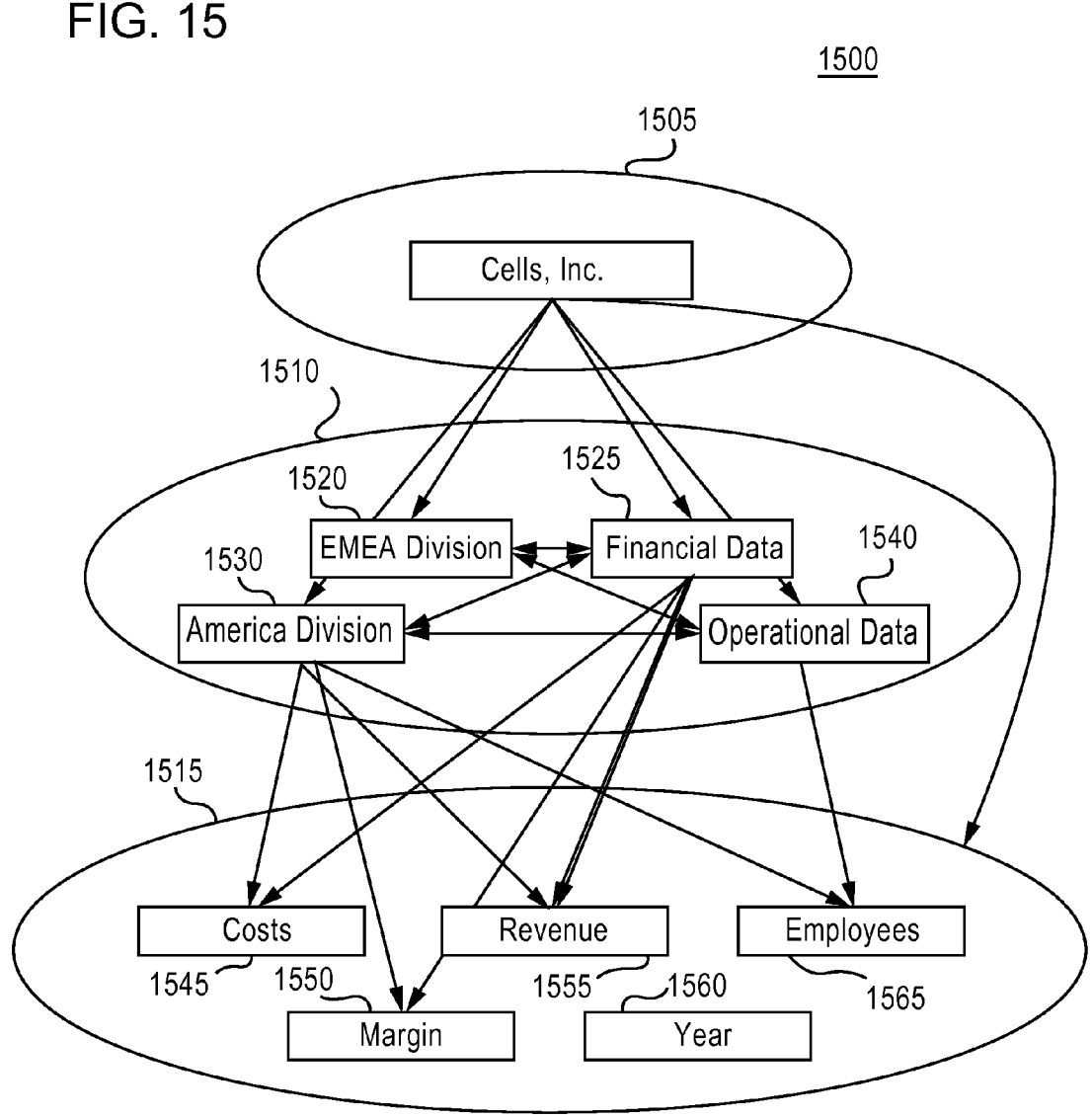
FIG. 15 illustrates an exemplary hierarchical tag structuring organization schema implemented across a business organization.

Tags may be organized within and accessed according to the spreadsheet file that they are contained in. However, other ways to organize, access, and refer to tags can exist. FIG. 15 illustrates an exemplary hierarchical tag structuring organization schema 1500 implemented across a business organization, as opposed to a traditional director and files-based organization schema. A business organization may include a top level organization 1505 which in this case is labeled as "Cells, Inc." for purposes of discussion. The hierarchical tag structuring organization schema 1500 may include a number of categories 1510 that represent potential ways to divide tags in a logical tree or a criteria for filtering tags that fall under any given a top level organization 1505. The hierarchical tag structuring organization schema 1500 may further include one or more tags 1515 created by users within the business organization in a spreadsheet application such as spreadsheet application 110 shown in FIG. 1.

In the embodiment described in FIG. 15 the generated categories 1520 for the business organization 1505 may include various business units in a company. Exemplary categories provided in FIG. 15 include an EMEA Division 1520 and an America Division 1530. Other categories may be provided for sub-teams, specific projects, or types of data. For example, financial data category 1525 and operational data category 1540 may be suitable categories for Cells, Inc. and therefore included as categories 1520 for the business organization 1505.

Tags 1515 may be implemented by any user of a spreadsheet application, such as spreadsheet application 110, shown in FIG. 1. For example, based on user input, a processor within a server computing device, such as a server computing device discussed above within multicomputer network system 100 may create a cost tag 1545, a margin tag 1550, a revenue tag 1555, a year tag 1560, and or an employee tag 1565. Of course, these tags are exemplary and provided for purposes of discussion. Any number of tags may be implemented in infinite numbers or combinations to suit the needs of a particular organization 1505. Further, these tags may be created by a processor executing the tag context evaluation and analysis algorithms disclosed herein. Further, as shown by the double-ended arrows in FIG. 15, categories 1510 may be layered to filter data in a logical way. For example, while the EMEA Division category 1520 filters potential references down to the tags that may be associated with the EMEA division, combining the EMEA Division category 1520 with the financial data category 1525, filters relevant tags down to only those tags 1515 that contain financial data and are associated with the EMEA division.

Categories 1510 and tags 1515 may be organically generated by users of the spreadsheet application as needed for any particular business organization 1505 and may encompass any needed information. The categories 1510 and tags 1515 are generated as needed based on context and do not come from a pre-set library of potential categories. Further, since tags 1515 are stored logically, any user of the spreadsheet application may find data faster and more intuitively. Any reference to any tag may be readily accessed without the need of sorting through a number of files or spreadsheets, increasing collaboration between users of the spreadsheet application. The logical organization of tags 1515 in categories 1510 further facilitates access to the information stored in a cloud database, such as cloud database 115 by any remote user of the spreadsheet application. Providing a centralized cloud database with a shared namespace makes every authenticated user's data available to every other remote authenticated user and, moreover, makes that data easily discoverable by other users.

Figure 16:
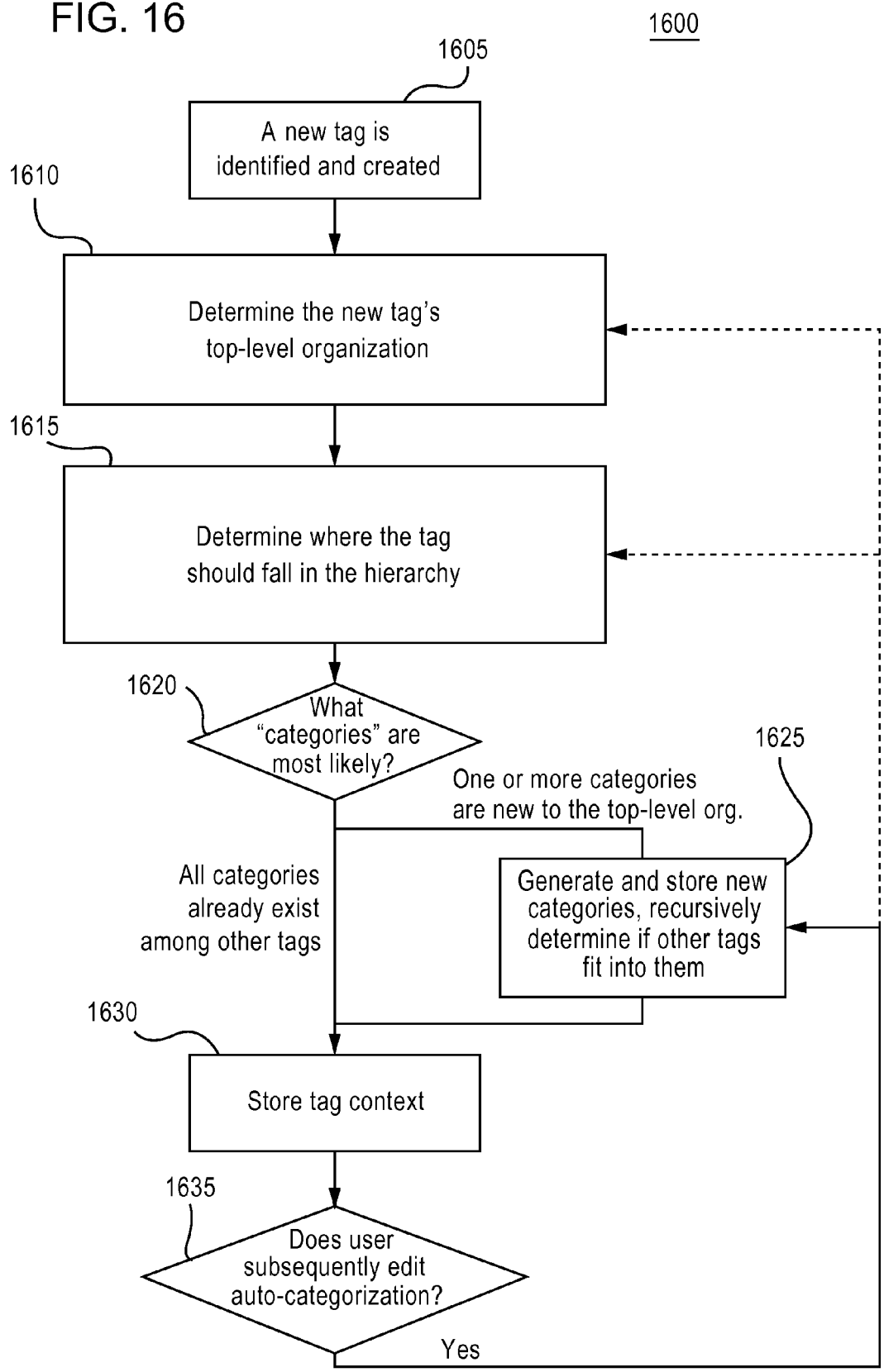
FIG. 16 illustrates an exemplary method for tag context identification.

FIG. 16 illustrates an exemplary method 1600 for tag context identification. In this exemplary embodiment, a spreadsheet may be provided by a spreadsheet application such as spreadsheet application 110 shown in FIG. 1, operating on a server computing device, such as a server computing device discussed above, in a multicomputer network, such as multicomputer network system 100, shown in FIG. 1. The user may interact with the spreadsheet application via a user device connected to the server computing device executing the spreadsheet application, such as user device 105 shown in FIG. 1. A processor within the server computing device may interface with both the user device and a cloud database, such as cloud database 115, shown in FIG. 1.

Method 1600 begins at step 1605 where a new tag is identified and created using the various techniques and methods disclosed herein. At step 1610, the processor within the server computing device may determine the new tag's top-level organization based on contextual information (who the user is), file-level information, structural information, language information, and more. In the example of the business organization in FIG. 15, an example of a top-level organization is Cells, Inc. Once the processor within the server computing device has determined the top level organization at step 1610, the processor within the server computing device determines where the tag should fall within the hierarchy shown in FIG. 15 (i.e., which categories or tags should be referenced by the tag) based on an analysis of the top level organization and the existing structure beneath the organization and the contextual information obtained in step 1610. In some cases, the processor within the server computing device may determine that the tag should be referenced by multiple categories.

The processor within the server device then determines what categories are most likely related to the new tag in step 1620. If no categories are sufficiently likely, method 1600 ends. If all categories that could be related to the new tag already exist among the other tags, method 600 proceeds to step 1630. However, if one or more categories are new to the top level organization, the processor within the server computing device may generate and store new categories within the cloud database at step 1615. The generation and storage of new categories may be performed recursively at step 1615 by the processor within the server computing device to determine if other previously created tags fit into the newly generated category.

Method 1600 advances to step 1630 where the tag's categorical context may be stored within a cloud database. At step 1635, a user may be provided with an opportunity via a display on a user device to edit the automatic categorization of the tag within the categories that have been determined as being related to those categories. If the user does edit the related categories (1635—Yes), method 1600 may return to step 1610, 1615, and/or 1625 because the user initiated edit may have a contextual impact on identification of future tags. Otherwise, method 1600 ends.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A digital processing system for transferring data for remote access across a multicomputer data network, comprising:
   a processor which:
      receives user input representative of data input in an electronic table, the data input including textual data input and numerical data input;
      analyzes one or more instances of contextual meaning of the textual data input in the electronic table;
      identifies, based on the contextual meaning of the textual data input in the electronic table, which numerical data input is associated with the contextual meaning of the textual data input in the electronic table; and
      assigns a reference tag corresponding to the contextual meaning of the textual data to the numerical data input in the electronic table based on the identification of which numerical data is associated with the contextual meaning of the textual data input in the electronic table; and
   a memory device which:
      stores the reference tag and provides one or more users of the multicomputer data network with access to the stored reference tag.

2. The system of claim 1, wherein the processor determines whether or not the reference tag references a single cell within the electronic table.

3. The system of claim 1, wherein the processor determines whether or not the reference tag references a horizontal row of cells within the electronic table.

4. The system of claim 1, wherein the processor determines whether or not the reference tag references a vertical column of cells within the electronic table.

5. The system of claim 1, wherein the contextual meaning of the textual data input in the electronic table is identified using natural language processing.

6. The system of claim 5, wherein the processor further analyzes one or more instances of contextual information, associated with the textual data input and the numerical data input which includes at least one of language information, structural information, formatting information, input value information, table creator information, storage location information, file name information, information representative of whether data within a table has a relationship to data with another table, or data type information about the data input in the electronic table.

7. The system of claim 1, wherein one or more cells within the electronic table are indexed with respect to the reference tag within the electronic table.

8. The system of claim 1, wherein the memory device maintains a list of one or more assigned reference tags.

9. A method for transferring data for remote access across a multicomputer data network, comprising:
   receiving, by one or more processors within a multicomputer data network, user input representative of a data input in an electronic table, the data input including textual data input and numerical data input;
   analyzing, by the one or more processors within the multicomputer data network, one or more instances of contextual meaning of the textual data input in the electronic table;
   identifies, by the one or more processors within the multicomputer data network and based on the contextual meaning of the textual data input in the electronic table, which numerical data input is associated with the contextual meaning of the textual data input in the electronic table;
   assigning, by the one or more processors within the multicomputer data network, a reference tag corresponding to the contextual meaning of the textual data to the numerical data input in the electronic table based on the identification of which numerical data is associated with the contextual meaning of the textual data input in the electronic table;
   storing, by the one or more processors within the multicomputer data network, the reference tag within a memory device that provides one or more users of the multicomputer data network with access to the stored reference tag.

10. The method of claim 9, wherein assigning the reference tag to the data input in the electronic table further comprises determining whether or not the reference tag references a single cell within the electronic table.

11. The method of claim 9, wherein assigning the reference tag to the data input in the electronic table further comprises determining whether or not the reference tag references a horizontal tag within the electronic table.

12. The method of claim 9, wherein assigning the reference tag to the data input in the electronic table further comprises determining whether or not the reference tag references a vertical tag within the electronic table.

13. The method of claim 9, wherein the contextual meaning of the textual data input in the electronic table is identified using natural language processing.

14. The method of claim 13, wherein the one or more processors within the multicomputer data network further analyzes one or more instances of contextual information, associated with the textual data input and the numerical data input which includes at least one of language information, structural information, formatting information, input value information, or data type information about the data input in the electronic table.

15. The method of claim 9, wherein one or more cells within the electronic table are indexed with respect to the reference tag within the electronic table.

16. The method of claim 9, wherein the memory device is further configured to maintain a list of one or more assigned reference tags.

17. A non-transitory computer-readable storage medium storing computer instructions that direct a processor to perform a method for transferring data for remote access across a multicomputer data network, comprising:

receiving user input representative of a data input in an electronic table, the data input including textual data input and numerical data input;

analyzing one or more instances of contextual meaning of the textual data input in the electronic table;

identifies, based on the contextual meaning of the textual data input in the electronic table, which numerical data input is associated with the contextual meaning of the textual data input in the electronic table;

assigning a reference tag corresponding to the textual meaning of the textual data to the numerical data input in the electronic table based on the identification of which numerical data is associated with the contextual meaning of the textual data input in the electronic table; and storing the reference tag within a memory device that provides one or more users of the multicomputer data network with access to the stored reference tag.

18. The non-transitory computer-readable storage medium of claim 17 wherein the memory device maintains a list of one or more assigned reference tags.

* * * * *